United States Patent
Marzano et al.

(10) Patent No.: US 12,132,347 B2
(45) Date of Patent: Oct. 29, 2024

(54) METHOD, SYSTEM, AND COMPUTER PROGRAM PRODUCT FOR UNINTERRUPTED POWER USING AN ARRAY OF ULTRA-CAPACITORS

(71) Applicant: Velocity Magnetics, Inc., New Castle, PA (US)

(72) Inventors: Domenic P. Marzano, New Castle, PA (US); Alex R. Rugh, New Castle, PA (US); Joseph L. Hake, New Castle, PA (US)

(73) Assignee: Velocity Magnetics, Inc., New Castle, PA (US)

( * ) Notice: Subject to any disclaimer, the term of this patent is extended or adjusted under 35 U.S.C. 154(b) by 0 days.

(21) Appl. No.: 17/891,349

(22) Filed: Aug. 19, 2022

(65) Prior Publication Data

US 2022/0393505 A1    Dec. 8, 2022

Related U.S. Application Data

(63) Continuation of application No. PCT/US2021/018732, filed on Feb. 19, 2021.
(Continued)

(51) Int. Cl.
*H02J 9/06* (2006.01)
*H02J 7/34* (2006.01)

(52) U.S. Cl.
CPC ............. *H02J 9/062* (2013.01); *H02J 7/345* (2013.01); *H02J 2207/50* (2020.01)

(58) Field of Classification Search
CPC ......... H02J 9/062; H02J 7/345; H02J 2207/50
(Continued)

(56) References Cited

U.S. PATENT DOCUMENTS 2,895,083 A * 7/1959 Quinlan ................. H01H 9/226
307/328
3,865,043 A    2/1975 Schwarzler
(Continued)

FOREIGN PATENT DOCUMENTS

CN    102723763 A    10/2012
DE    102010062362 A1    6/2012
(Continued)

OTHER PUBLICATIONS

"An Electrical Runway", The Engineer, pp. 379-380, 1946.
(Continued)

*Primary Examiner* — Michael R. Fin
(74) *Attorney, Agent, or Firm* — The Webb Law Firm

(57) ABSTRACT

Provided is a system for uninterrupted power using an array of capacitive elements (e.g., ultra-capacitors). The system may include an input, which may receive power from a first power source. A direct current (DC) bus may be connected to the input and may receive power from the input. An array of capacitive elements (e.g., ultra-capacitors) may be connected to the DC bus. An output may be connected the DC bus. The output may include an alternating current (AC) power supply, which may supply power to at least one facility. At least one controller may control charging and discharging of the array of capacitive elements (e.g., ultra-capacitors) connected to the DC bus to supply power from the DC bus to the output. A method and computer program product are also disclosed.

14 Claims, 7 Drawing Sheets

Related U.S. Application Data

(60) Provisional application No. 63/127,948, filed on Dec. 18, 2020, provisional application No. 63/107,826, filed on Oct. 30, 2020, provisional application No. 62/978,999, filed on Feb. 20, 2020.

(58) Field of Classification Search
USPC .......................................................... 307/64
See application file for complete search history.

(56) References Cited

U.S. PATENT DOCUMENTS

| | | | |
|---|---|---|---|
| 3,974,778 A | 8/1976 | Black et al. | |
| 4,061,089 A | 12/1977 | Sawyer | |
| 4,165,695 A | 8/1979 | Schwarzkopf | |
| 4,343,223 A | 8/1982 | Hawke et al. | |
| 4,697,131 A | 9/1987 | Schauder et al. | |
| 4,881,446 A | 11/1989 | Marks et al. | |
| 4,958,115 A | 9/1990 | Miller | |
| 5,221,863 A | 6/1993 | Motegi | |
| 5,260,642 A | 11/1993 | Huss | |
| 5,821,658 A | 10/1998 | Boggs, III | |
| 6,060,847 A | 5/2000 | Hettema et al. | |
| 6,075,378 A * | 6/2000 | Okamura | H02H 7/16 324/548 |
| 6,170,402 B1 | 1/2001 | Rude et al. | |
| 6,253,885 B1 | 7/2001 | Tsai et al. | |
| 6,348,004 B1 | 2/2002 | Houben | |
| 6,439,129 B2 | 8/2002 | Begotti | |
| 6,499,701 B1 | 12/2002 | Thornton et al. | |
| 6,755,749 B2 | 6/2004 | Stengel | |
| 6,812,591 B2 * | 11/2004 | Umemura | H02J 7/345 307/66 |
| 7,061,131 B2 | 6/2006 | King et al. | |
| 7,918,741 B2 | 4/2011 | Hunter et al. | |
| 7,962,772 B2 | 6/2011 | Jain | |
| 8,038,542 B2 | 10/2011 | Hunter et al. | |
| 8,136,453 B2 | 3/2012 | Hunter et al. | |
| 8,193,662 B1 * | 6/2012 | Carlson | G06F 1/30 307/64 |
| 8,198,890 B2 | 6/2012 | Derfiora | |
| 8,378,608 B2 | 2/2013 | Robertson | |
| 8,727,078 B2 | 5/2014 | Marzano et al. | |
| 8,826,824 B2 | 9/2014 | Hunter et al. | |
| 8,963,026 B2 | 2/2015 | Kramer | |
| 9,124,147 B2 | 9/2015 | Kramer | |
| 9,815,665 B2 | 11/2017 | Rogers et al. | |
| 10,046,644 B2 | 8/2018 | Marzano | |
| 2002/0103033 A1 | 8/2002 | Stengel | |
| 2002/0175522 A1 * | 11/2002 | Wacknov | H02P 9/30 290/52 |
| 2002/0177929 A1 | 11/2002 | Kumar | |
| 2003/0019388 A1 | 1/2003 | Spieldiener et al. | |
| 2004/0070286 A1 | 4/2004 | Marzano | |
| 2005/0039630 A1 | 2/2005 | Kumar et al. | |
| 2005/0178632 A1 | 8/2005 | Ross | |
| 2005/0263331 A1 | 12/2005 | Sopko et al. | |
| 2005/0263356 A1 | 12/2005 | Marzano et al. | |
| 2006/0043792 A1 * | 3/2006 | Hjort | H02J 9/062 307/1 |
| 2006/0192433 A1 * | 8/2006 | Fuglevand | H02J 7/345 307/64 |
| 2007/0142985 A1 | 6/2007 | Kumar | |
| 2007/0207866 A1 | 9/2007 | Hunter | |
| 2007/0207867 A1 | 9/2007 | Hunter | |
| 2007/0207869 A1 | 9/2007 | Hunter | |
| 2008/0021602 A1 | 1/2008 | Kingham et al. | |
| 2008/0053299 A1 | 3/2008 | Taylor | |
| 2008/0079262 A1 | 4/2008 | McGinley et al. | |
| 2008/0257662 A1 | 10/2008 | Kunz | |
| 2008/0283348 A1 | 11/2008 | Evans | |
| 2009/0114114 A1 | 5/2009 | Rose et al. | |
| 2009/0177595 A1 | 7/2009 | Dunlap et al. | |
| 2010/0148750 A1 | 6/2010 | Derfiora | |
| 2011/0001353 A1 | 1/2011 | Emerson et al. | |
| 2011/0056407 A1 | 3/2011 | Roodenburg et al. | |
| 2011/0062786 A1 | 3/2011 | Rozman et al. | |
| 2011/0115425 A1 | 5/2011 | Olsson | |
| 2012/0025614 A1 | 2/2012 | Taimela et al. | |
| 2012/0064984 A1 | 3/2012 | Hunter et al. | |
| 2012/0146418 A1 * | 6/2012 | Weir | H02J 3/38 307/64 |
| 2012/0160124 A1 | 6/2012 | Barbee et al. | |
| 2012/0173065 A1 | 7/2012 | Hunter et al. | |
| 2013/0025492 A1 | 1/2013 | Crawford et al. | |
| 2013/0032053 A1 | 2/2013 | Stoker | |
| 2013/0032416 A1 | 2/2013 | Gouker et al. | |
| 2013/0041514 A1 | 2/2013 | Apalenek et al. | |
| 2013/0106331 A1 | 5/2013 | Guzelgunler | |
| 2013/0138279 A1 | 5/2013 | Shi et al. | |
| 2013/0168961 A1 | 7/2013 | Stahlkopf et al. | |
| 2013/0214604 A1 * | 8/2013 | Johnson, Jr. | H02J 9/062 307/64 |
| 2014/0015321 A1 | 1/2014 | Nordin | |
| 2014/0084817 A1 | 3/2014 | Bhavaraju et al. | |
| 2014/0085835 A1 | 3/2014 | Berry | |
| 2014/0175886 A1 | 6/2014 | Kwok et al. | |
| 2014/0225429 A1 | 8/2014 | Mazumdar | |
| 2014/0244082 A1 | 8/2014 | Caron | |
| 2014/0361624 A1 * | 12/2014 | Ault | H02J 9/062 307/65 |
| 2015/0083018 A1 | 3/2015 | Clark et al. | |
| 2015/0084423 A1 * | 3/2015 | Gamborg | H02J 9/06 307/64 |
| 2015/0088384 A1 | 3/2015 | Darraba | |
| 2015/0360581 A1 | 12/2015 | King et al. | |
| 2016/0121908 A1 | 5/2016 | Ahmad | |
| 2016/0172900 A1 * | 6/2016 | Welch, Jr. | H05K 7/1492 307/64 |
| 2017/0126163 A1 | 5/2017 | Liang | |
| 2017/0133852 A1 | 5/2017 | Macdonald | |
| 2019/0331084 A1 | 10/2019 | Fridrich | |
| 2022/0376546 A1 * | 11/2022 | Klepacki | H02J 9/061 |

FOREIGN PATENT DOCUMENTS

| | | |
|---|---|---|
| NL | 1006651 C2 | 1/1999 |
| WO | 2009120063 A1 | 10/2009 |
| WO | 2013103354 A1 | 7/2013 |

OTHER PUBLICATIONS

Ianuzzi et al., "A New Supercapacitor Design Methodology for Light Transportation Systems Saving", Energy Management Systems, 2011, pp. 183-198.

Miller et al., "Electrochemical Capacitors: Challenges and Opportunities for Real-World Applications", The Electrochemical Society Interface, 2008, pp. 53-57.

"News Release", Maxwell Technologies, 2014, pp. 1-3.

Palma Fanjul, "Some New Applications of Supercapacitors in Power Electronic Systems", OAKTrust, 113 pages, 2004.

Yao et al., "Research and Application of Elevator Energy-Saving Devices with Super Capacitor to Store Energy", Advances in Automation and Robotics, 2011, pp. 429-436, vol. 1.

Zhao et al., "Research on a High Energy Utilization Efficiency Electromagnetic Aircraft Launcher with an Ultracapacitor Bank", Institute of Electrical and Electronics Engineers (IEEE), 2008, 12 pages.

Peri et al., "Optimal Design of Energy Storage System using Ultracapacitors for Contingency Power Applications", 2020 IEEE International Conference on Power Electronics, Smart Grid and Renewable Energy (PESGRE2020), 2020, pp. 1-6.

\* cited by examiner

METHOD, SYSTEM, AND COMPUTER PROGRAM PRODUCT FOR UNINTERRUPTED POWER USING AN ARRAY OF ULTRA-CAPACITORS

CROSS REFERENCE TO RELATED APPLICATIONS

This application is a Bypass Continuation application of International Application No. PCT/US2021/018732 filed Feb. 19, 2021, and claims priority to U.S. Provisional Patent Application Nos. 62/978,999, filed on Feb. 20, 2020, 63/107,826, filed Oct. 30, 2020, and 63/127,948, filed Dec. 18, 2020, the disclosures of which are hereby incorporated by reference in their entireties.

BACKGROUND

1. Field

This disclosed subject matter relates generally to methods, systems, and products for uninterrupted power and, in some particular embodiments, to a method, system, and computer program product for uninterrupted power using an array of capacitive elements (e.g., ultra-capacitors).

2. Technical Considerations

For certain facilities, it may be desirable (e.g., required, preferable, critical for safety, and/or the like) to have uninterrupted (e.g., constant, constantly available, and/or the like) power. For example, when there is a disruption in a primary power source (e.g., power grid and/or the like), it may be desirable to have an additional power source available.

However, certain systems for energy generation, storage, and/or management may be inadequate. For example, generators (e.g., diesel generators, gasoline generators, and/or the like) may have a significant delay during startup when insufficient power is being generated. Additionally, such generators may lack flexibility in handling fluctuations in power demand (e.g., insufficient power available for large spikes in power demand, wasting fuel during periods of low power demand, and/or the like). Further, certain energy storage components may be inadequate. For example, a flywheel generator is sometimes used to store energy from a grid and deliver it to a particular load. However, a flywheel generator and/or an out-building to house and support the flywheel generator may be expensive, heavy, and often noisy. Moreover, the flywheel generator may be unable to store electrical energy converted from kinetic energy efficiently due to mechanical losses and/or the like. Furthermore, the flywheel generator may require expensive and time-consuming maintenance as mechanical parts wear out. Batteries (e.g., chemical batteries, such as lithium batteries, lead-acid batteries, and/or the like) are sometimes used to store energy and deliver it to a particular load. However, batteries may require a relatively long recharge time (e.g., many hours, such as 10 hours, 12 hours, 24 hours, or more) compared to the time that energy stored therein can be consumed/discharged (e.g., a few minutes, such as 1 minute, 2 minutes, and/or the like). In addition, batteries may require periodic chemical maintenance and/or periodic replacement, e.g., because batteries may degrade relatively quickly if they are constantly kept fully charged (e.g., constantly trickle charging to be kept fully charged). As such, batteries may typically be connected in parallel with a facility (e.g., so that they are not constantly connected and/or constantly charging), but being in connection in this manner may require an expensive transfer switch to rapidly switch to battery power when a primary power source fails (e.g., power grid outage and/or the like) and/or may result in the batteries being fully charged upon switching to battery power. In addition, batteries can be relatively expensive to obtain and maintain, may include chemicals that are not environmentally friendly, and/or may be difficult and/or expensive to dispose of (e.g., because of such chemicals).

Additionally, for such facilities, it may be desirable to condition the power from the power source(s) (e.g., primary and/or secondary power sources). For example, when there is a large increase in power demand (e.g., a temporary increase thereof), it may be desirable to have the capacity to handle that increase. Additionally or alternatively, it may be desirable to suppress and/or protect against surges from the power source (e.g., electrical surges from the power grid and/or the like). Additionally or alternatively, it may be desirable to filter the power from the power source. Additionally or alternatively, when three-phase power is used (e.g., in industrial settings, for large facilities, and/or the like), sometimes one phase fails, which may result in inadequate power to the facility.

However, certain systems for energy management may be inadequate. For example, such facilities may have to install a relatively high amperage service (e.g., up to their maximum possible power demand, such as 1,000 amps or more) to a power grid to ensure sufficient power is available during times of peak power demand. However, such a large service may require a very large transformer, large conductors (e.g., thick wires and/or cables), and/or other components that may result in very high initial cost, ongoing maintenance costs, time spent on the installation and/or maintenance thereof, and/or the like, all of which can be especially burdensome if the typical (e.g., average and/or the like) power demands of the facility are less than the peak power demand. Moreover, in some areas, such large amperage services may not be available due to the size and/or other limitations of the electrical infrastructure of the power grid in the area.

SUMMARY

Accordingly, it is an object of the presently disclosed subject matter to provide methods, systems, and computer program products for uninterrupted power using an array of capacitive elements (e.g., ultra-capacitors).

According to non-limiting embodiments or aspects, provided is a system for uninterrupted power using an array of capacitive element. In some non-limiting embodiments or aspects, a system for using an array of capacitive element may include an input configured to receive power from a first power source. A direct current (DC) bus may be connected to the input and configured to receive power from the input. An array of capacitive elements (e.g., ultra-capacitors) may be connected to the DC bus. An output may be connected to the DC bus. The output may include an alternating current (AC) power supply configured to supply power to at least one facility. At least one controller may be configured to control charging and discharging of the array of capacitive elements (e.g., ultra-capacitors) connected to the DC bus to supply power from the DC bus to the output.

In some non-limiting embodiments, the controller may be further configured to detect an interruption of power from the first power source. Additionally or alternatively, the controller may be further configured to control discharging of the array of capacitive elements (e.g., ultra-capacitors) connected to the DC bus to continuously supply power from the DC bus to the output during the interruption.

In some non-limiting embodiments, the system may further include a transfer switch. Additionally or alternatively, the controller may be further configured to switch the transfer switch from the first power source to a second power source. Additionally or alternatively, the input may be further configured to receive power from the second power source.

In some non-limiting embodiments, the first power source may include a power grid. Additionally or alternatively, the system may further include a circuit breaker connected between the power grid and the input.

In some non-limiting embodiments, the system may further include a converter configured to convert power from a first voltage to a second voltage, the second voltage higher than the first voltage. In some non-limiting embodiments, the converter may include a transformer.

In some non-limiting embodiments, the input may include at least one of a circuit breaker, a filter, a fuse, a transformer, a rectifier, an inductor, a control board, or any combination thereof.

In some non-limiting embodiments, the controller may include at least one of a power supply, a programmable logic controller, a human-machine interface, or any combination thereof.

In some non-limiting embodiments, the system may further include at least one fuse connected between the DC bus and the array of capacitive elements (e.g., ultra-capacitors).

In some non-limiting embodiments, the system may further include at least one discharge circuit connected to the array of capacitive elements (e.g., ultra-capacitors). For example, the discharge circuit may be configured to discharge energy from the array of capacitive elements (e.g., ultra-capacitors).

In some non-limiting embodiments, the output may include at least one filter.

In some non-limiting embodiments, the AC power supply of the output may include a variable frequency drive.

In some non-limiting embodiments, the AC power supply of the output may include a bidirectional drive.

According to non-limiting embodiments or aspects, provided is a method for uninterrupted power using an array of capacitive element. In some non-limiting embodiments or aspects, a method for using an array of capacitive element may include receiving power at an input from a first power source. Power may be supplied from the input to a DC bus. Charging and discharging of an array of capacitive elements (e.g., ultra-capacitors) connected to the DC bus may be controlled to supply power from the DC bus to an output. Power may be supplied from an AC power supply of the output to at least one facility.

In some non-limiting embodiments, the first power source may include an AC power source. Additionally or alternatively, the input may convert power from AC to DC.

In some non-limiting embodiments, the first power source may include a DC power source.

In some non-limiting embodiments, the input may convert power from a first voltage to a second voltage. For example, the second voltage may be higher than the first voltage.

In some non-limiting embodiments, the input may filter power with at least one first filter. Additionally or alternatively, the output may filter power with at least one second filter.

In some non-limiting embodiments, an interruption of power from the first power source may be detected. Additionally or alternatively, discharging of the array of capacitive elements (e.g., ultra-capacitors) connected to the DC bus may be controlled to continuously supply power from the DC bus to the output during the interruption.

In some non-limiting embodiments, a transfer switch may be switched from the first power source to a second power source. Additionally or alternatively, power may be received at the input from the second power source. Additionally or alternatively, power may be supplied from the input to the DC bus. Additionally or alternatively, charging and discharging of the array of capacitive elements (e.g., ultra-capacitors) connected to the DC bus may be controlled to supply power from the DC bus to the output.

In some non-limiting embodiments, the second power source may include an AC power source. Additionally or alternatively, the input may convert power from AC to DC.

In some non-limiting embodiments, the second power source may include a DC power source.

According to non-limiting embodiments or aspects, provided is a computer program product for uninterrupted power using an array of capacitive element. In some non-limiting embodiments or aspects, a computer program product for using an array of capacitive element may include at least one non-transitory computer-readable medium including one or more instructions that, when executed by at least one processor, cause the at least one processor to control an input to receive power at the input from a first power source and supply power from the input to a direct current (DC) bus; control charging and discharging of an array of capacitive elements (e.g., ultra-capacitors) connected to the DC bus to supply power from the DC bus to an output; and control the output to supply power from an alternating current (AC) power supply of the output to at least one facility.

In some non-limiting embodiments, the instructions may further cause the at least one processor to detect an interruption of power from the first power source at the input and/or control discharging of the array of capacitive elements (e.g., ultra-capacitors) connected to the DC bus to continuously supply power from the DC bus to the output during the interruption.

In some non-limiting embodiments, the instructions may further cause the at least one processor to switch a transfer switch from the first power source to a second power source, control the input to receive power from the second power source and supply power from the input to the DC bus, and/or control charging and discharging of the array of capacitive elements (e.g., ultra-capacitors) connected to the DC bus to supply power from the DC bus to the output.

Further embodiments or aspects are set forth in the following numbered clauses:

Clause 1: A system, comprising: an input configured to receive power from a first power source; a direct current (DC) bus connected to the input and configured to receive power from the input; an array of capacitive elements (e.g., ultra-capacitors) connected to the DC bus; an output connected to the DC bus, the output comprising an alternating current (AC) power supply configured to supply power to at least one facility; and at least one controller configured to control charging and discharging of the array of capacitive elements (e.g., ultra-capacitors) connected to the DC bus to supply power from the DC bus to the output.

Clause 2: The system of clause 1, wherein the controller is further configured to: detect an interruption of power from the first power source; and control discharging of the array of capacitive elements (e.g., ultra-capacitors) connected to the DC bus to continuously supply power from the DC bus to the output during the interruption.

Clause 3: The system of any preceding clause, further comprising a transfer switch, wherein the controller is further configured to switch the transfer switch from the first power source to a second power source, and wherein the input is further configured to receive power from the second power source.

Clause 4: The system of any preceding clause, wherein the first power source comprises a power grid, the system further comprising: a circuit breaker connected between the power grid and the input.

Clause 5: The system of any preceding clause, further comprising a converter configured to convert power from a first voltage to a second voltage, the second voltage higher than the first voltage.

Clause 6: The system of any preceding clause, wherein the converter comprises a transformer.

Clause 7: The system of any preceding clause, wherein the input comprises at least one of a circuit breaker, a filter, a fuse, a transformer, a rectifier, an inductor, a control board, or any combination thereof.

Clause 8: The system of any preceding clause, wherein the controller comprises at least one of a power supply, a programmable logic controller, a human-machine interface, or any combination thereof.

Clause 9: The system of any preceding clause, further comprising at least one fuse connected between the DC bus and the array of capacitive elements (e.g., ultra-capacitors).

Clause 10: The system of any preceding clause, further comprising at least one discharge circuit connected to the array of capacitive elements (e.g., ultra-capacitors), the discharge circuit configured to discharge energy from the array of capacitive elements (e.g., ultra-capacitors).

Clause 11: The system of any preceding clause, wherein the output comprises at least one filter.

Clause 12: The system of any preceding clause, wherein the AC power supply of the output comprises a variable frequency drive.

Clause 13: The system of any preceding clause, wherein the AC power supply of the output comprises a bidirectional drive.

Clause 14: A method, comprising: receiving power at an input from a first power source; supplying power from the input to a direct current (DC) bus; controlling charging and discharging of an array of capacitive elements (e.g., ultra-capacitors) connected to the DC bus to supply power from the DC bus to an output; and supplying power from an alternating current (AC) power supply of the output to at least one facility.

Clause 15: The method of clause 14, wherein the first power source comprises an AC power source, further comprising: converting, by the input, power from AC to DC.

Clause 16: The method of any one of clauses 14 or 15, wherein the first power source comprises a DC power source.

Clause 17: The method of any one of clauses 14-16, further comprising: converting, by the input, power from a first voltage to a second voltage, the second voltage higher than the first voltage.

Clause 18: The method of any one of clauses 14-17, further comprising at least one of: filtering, by the input, power with at least one first filter; filtering, by the output, power with at least one second filter; or any combination thereof.

Clause 19: The method of any one of clauses 14-18, further comprising: detecting an interruption of power from the first power source; and controlling discharging of the array of capacitive elements (e.g., ultra-capacitors) connected to the DC bus to continuously supply power from the DC bus to the output during the interruption.

Clause 20: The method of any one of clauses 14-19, further comprising: switching a transfer switch from the first power source to a second power source; receiving power at the input from the second power source; supplying power from the input to the DC bus; and controlling charging and discharging of the array of capacitive elements (e.g., ultra-capacitors) connected to the DC bus to supply power from the DC bus to the output.

Clause 21: The method of any one of clauses 14-20, wherein the second power source comprises an AC power source, further comprising: converting, by the input, power from AC to DC.

Clause 22: The method of any one of clauses 14-21, wherein the second power source comprises a DC power source.

Clause 23: A computer program product comprising at least one non-transitory computer-readable medium including one or more instructions that, when executed by at least one processor, cause the at least one processor to: control an input to receive power at the input from a first power source and supply power from the input to a direct current (DC) bus; control charging and discharging of an array of capacitive elements (e.g., ultra-capacitors) connected to the DC bus to supply power from the DC bus to an output; and control the output to supply power from an alternating current (AC) power supply of the output to at least one facility.

Clause 24: The computer program product of clause 23, wherein the instructions further cause the at least one processor to: detect an interruption of power from the first power source at the input; and control discharging of the array of capacitive elements (e.g., ultra-capacitors) connected to the DC bus to continuously supply power from the DC bus to the output during the interruption.

Clause 25: The computer program product of any one of clauses 23 or 24, wherein the instructions further cause the at least one processor to: switch a transfer switch from the first power source to a second power source; control the input to receive power from the second power source and supply power from the input to the DC bus; and control charging and discharging of the array of capacitive elements (e.g., ultra-capacitors) connected to the DC bus to supply power from the DC bus to the output.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1A:
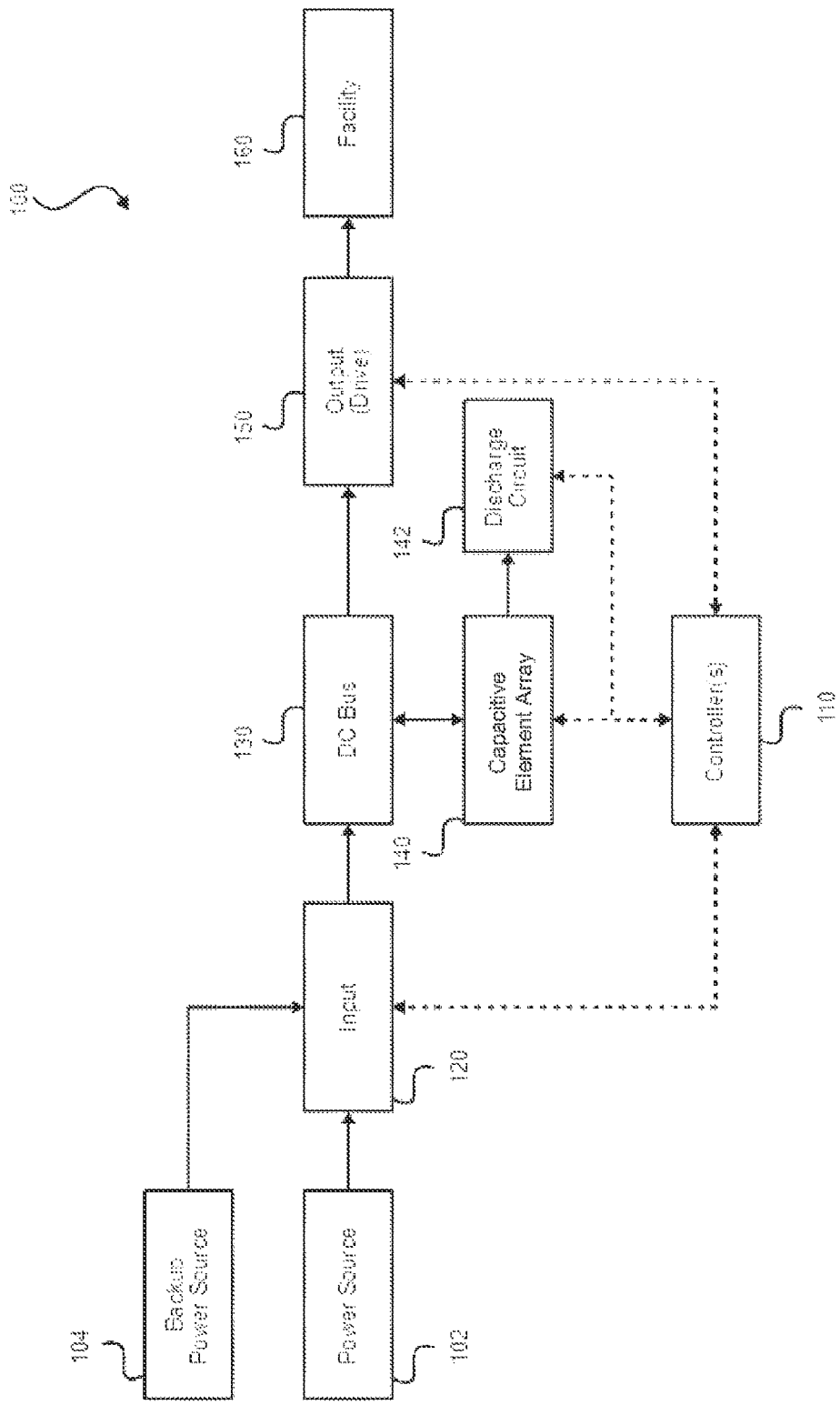
FIGS. 1A-1B are diagrams of a non-limiting embodiment of an environment in which methods, systems, and/or computer program products, as described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "controller" may refer to one or more computing devices or combinations of computing devices (e.g., processors, servers, devices, software applications, components of such, and/or the like). Reference to "a controller," "a processor," and/or the like, as used herein, may refer to a previously-recited controller or processor that is recited as performing a previous step or function, a different controller or processor, and/or a combination of controllers and/or processors. For example, as used in the specification and the claims, a first controller or a first processor that is recited as performing a first step or a first function may refer to the same or different controller or the same or different processor recited as performing a second step or a second function.

Non-limiting embodiments of the disclosed subject matter are directed to systems, methods, and computer program products for uninterrupted power, including, but not limited to, uninterrupted power using an array of capacitive elements (e.g., ultra-capacitors). For example, non-limiting embodiments of the disclosed subject matter provide an input to receive power from at least one power source, a direct current (DC) bus to receive power from the input, an array of capacitive elements (e.g., ultra-capacitors) connected to the DC bus, an output connected the DC bus, and at least one controller configured to control charging and discharging of the array of capacitive elements (e.g., ultra-capacitors) connected to the DC bus to supply power from the DC bus to the output, which supplies power to at least one facility (e.g., via an alternating current (AC) power supply of the output). Such embodiments provide techniques and systems that enable uninterrupted power for such a facility. Additionally or alternatively, such embodiments provide techniques and systems that enable controlling discharging of the array of capacitive elements (e.g., ultra-capacitors) connected to the DC bus to continuously supply power from the DC bus to the output during an interruption of power from a first (e.g., primary) power source. Additionally or alternatively, such embodiments provide techniques and systems that enable switching (e.g., via a transfer switch) from a first (e.g., primary) power source to a second (e.g., backup) power source in response to detecting a disruption of power from the first (e.g., primary) power source such that the array of capacitive elements (e.g., ultra-capacitors) may supply power to the output during a delay during startup of the second (e.g., backup) power source. Additionally or alternatively, such embodiments provide techniques and systems that allow for flexibility in handling fluctuations in power demand, e.g., by controlling charging of the array of capacitive elements (e.g., ultra-capacitors) during periods when power from the power source(s) exceeds power demand and/or controlling discharging of the array of capacitive elements (e.g., ultra-capacitors) during periods when power demand exceeds power from the power source(s). Additionally or alternatively, such embodiments provide techniques and systems that allow for storage of energy without mechanical moving parts, which may suffer from mechanical losses, inefficiency, and/or expensive and/or time-consuming maintenance. Additionally or alternatively, such embodiments provide techniques and systems that allow for energy storage and usage with relatively short recharge time compared to discharge time (e.g., the array of capacitive elements (e.g., ultra-capacitors) may be able to charge as fast as the array of capacitive elements (e.g., ultra-capacitors) may discharge). For example, the ratio of recharge time to discharge time may be 1:1 and/or the like. Additionally or alternatively, such embodiments provide techniques and systems that allow for storage of energy with ultra-capacitors, which may require reduced (e.g., eliminated, decreased, and/or the like) chemical maintenance and/or periodic replacement compared to batteries. Additionally or alternatively, such embodiments provide techniques and systems that allow for the capacitive element array (e.g., ultra-capacitor array) to be connected in series with the facility (e.g., the capacitive element array (e.g., ultra-capacitor array) is constantly connected and the charge level thereof is constantly maintained), and being connected in this matter may provide that no transfer switch may be necessary to switch to power from the ultra-capacitors when a primary power source fails (e.g., power grid outage and/or the like) and/or may ensure that the ultra-capacitors are maintained at the desired charge level when switching to power therefrom. Additionally or alternatively, such embodiments provide techniques and systems that enable use of ultra-capacitors that do not degrade over time (e.g., do not degrade nearly as quickly as batteries and/or the like), do not include chemicals that are environmentally harmful (e.g., ultra-capacitors may include materials such as aluminum and saline, which can be disposed of simply without additional expense). Additionally or alternatively, such embodiments provide techniques and systems that allow for the output (e.g., including a filter and/or an alternating current (AC) power supply such as a variable frequency drive) to provide conditioned power to the facility. For example, such conditioned power may be controlled (e.g., by the variable frequency drive and/or filter) to have a desired output waveform (e.g., 60 Hz AC power, three-phase AC power, and/or the like) regardless of disruptions of and/or surges in power from the power source(s). As such, the facility may be protected from surges in power from the power source(s). Moreover, when three-phase power is used as the power source, if one phase-fails, the capacitive element array (e.g., ultra-capacitor array) may provide additional power to absorb the drop in power from the power source, and the conditioned power from the output to the facility will still have all three phases properly supplied. Additionally or alternatively, such embodiments provide techniques and systems that provide an array of capacitive elements (e.g., ultra-capacitors) in parallel with a power source (e.g., power grid), which may enable operation of such an array of capacitive elements (e.g., ultra-capacitors) without interrupting the flow of power from the power source to the facility. Additionally or alternatively, such embodiments provide techniques and systems that allow for operating the array of capacitive elements (e.g., ultra-capacitors) simultaneously with and in parallel with power from a power source (e.g., power grid), thereby enabling operation of the facility in at least five modes, including receiving power directly from the power source (e.g., without receiving power from the array of capacitive elements (e.g., ultra-capacitors), such as in the event that the array of capacitive elements (e.g., ultra-capacitors) fails, is taken offline for maintenance, and/or the like), constantly receiving power from the power source in parallel with the array of capacitive elements (e.g., with a drive synchronizing power from the capacitive elements (e.g., ultra-capacitors) with power from the power source), receiving power directly from the array of capacitive elements (e.g., without receiving power from the power source, such as when the power source fails (e.g., a power outage, disconnecting the power for maintenance, and/or the like), receiving power from the array of capacitive elements (e.g., ultra-capacitors) with a backup power source supplying power to simultaneously charge the array of capacitive elements (e.g., ultra-capacitors), receiving power directly from the backup power source (e.g., without receiving power from the array of capacitive elements (e.g., ultra-capacitors), such as after the backup power source is fully started up and capable of supplying sufficient power to the facility without the array of capacitive elements (e.g., ultra-capacitors); after manually switching over to the backup power source; after the array of capacitive elements (e.g., ultra-capacitors) fails, is taken offline for maintenance, and/or the like; and/or the like), and/or the like. Additionally or alternatively, such embodiments provide techniques and systems that allow for using a bidirectional drive the array of capacitive elements (e.g., ultra-capacitors) with energy (e.g., excess energy, recapturable energy, and/or the like) flowing from the facility (e.g., in the reverse direction). Such recharging may not be practical with, e.g., batteries, since batteries need to be charged slowly over time compared to ultra-capacitors.

For the purpose of illustration, in the following description, while the presently disclosed subject matter is described with respect to methods, systems, and computer program products for uninterrupted power using an array of capacitive elements (e.g., ultra-capacitors), e.g., for a facility, one skilled in the art will recognize that the disclosed subject matter is not limited to the illustrative embodiments. For example, the methods, systems, and computer program products described herein may be used with a wide variety of settings, such as energy storage and/or management in any setting suitable for using such energy storage and management, e.g., a vehicle (e.g., on-track and/or off-track vehicle), portable equipment, industrial and/or manufacturing settings, and/or the like.

Figure 1B:
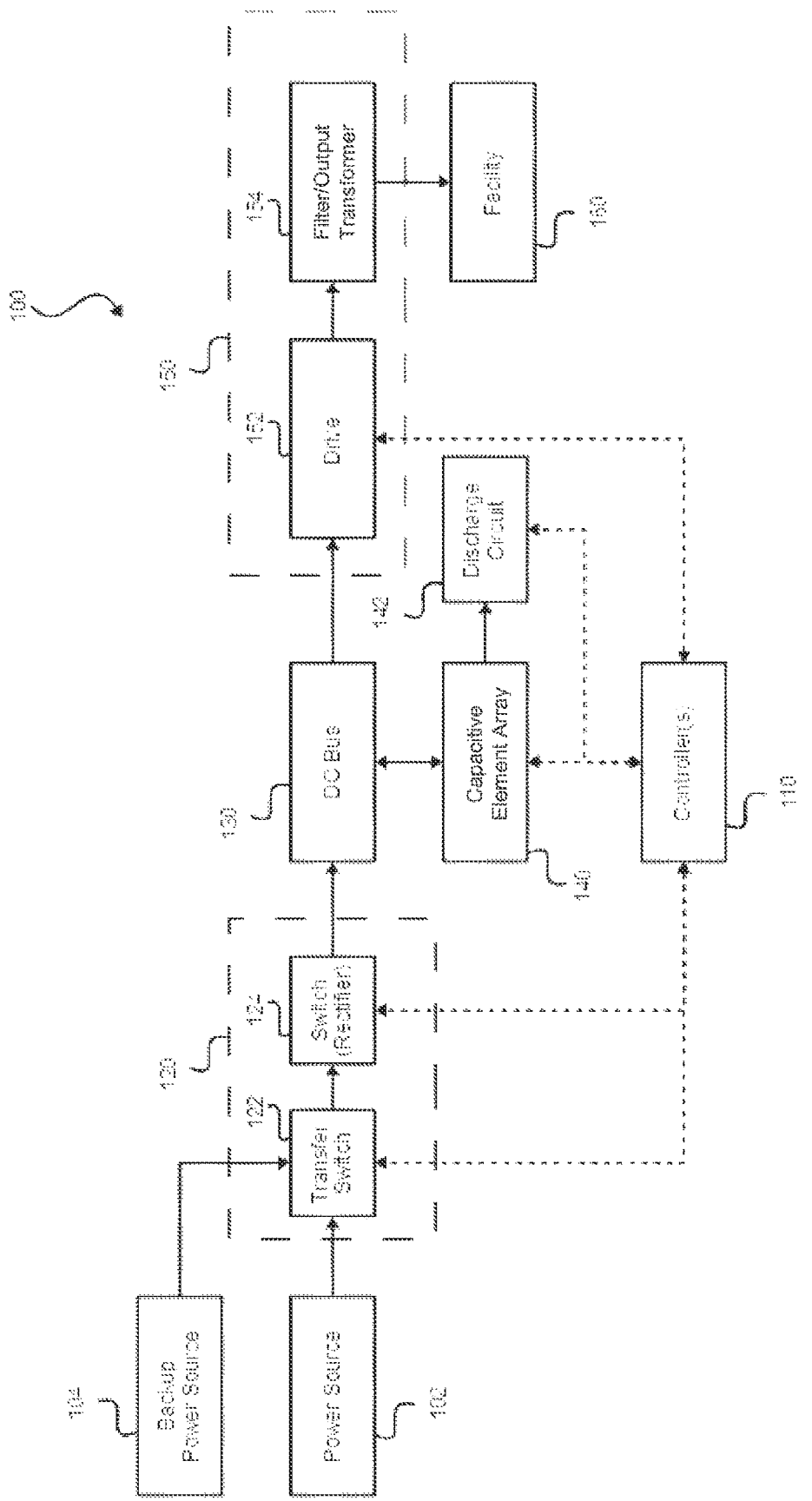

Referring now to FIGS. 1A-1B, FIGS. 1A-1B are diagrams of a non-limiting embodiment of an environment 100 in which systems, products, and/or methods, as described herein, may be implemented. As shown in FIGS. 1A-1B, environment 100 may include power source 102, backup power source 104, controller 110, input 120, direct current (DC) bus 130, capacitive element array 140, discharge circuit 142, output 150, facility 160, and/or the like.

Power source 102 may include any suitable power source. For example, power source 102 may include a connection to a power grid (e.g., public power grid, municipal power grid, utility power grid, three-phase (e.g., industrial and/or the like) power grid, single phase (e.g., residential and/or the like) power grid, and/or the like). Additionally or alternatively, power source 102 may include at least one battery, a windmill, a power plant (e.g., coal power plant, natural gas power plant, gasoline power plant, diesel power plant, nuclear power plant, any combination thereof, and/or the like), at least one solar panel (e.g., an array of solar panels), at least one thermoelectric device, a generator (e.g., diesel generator, gasoline generator, and/or the like), any combination thereof, and/or the like. In some non-limiting embodiments, power source 102 may include an alternating current (AC) power supply. Additionally or alternatively, power source 102 may include a DC power supply. In some non-limiting embodiments, power source 102 may be connected (e.g., electrically connected, coupled, and/or the like) to input 120 (e.g., via transfer switch 122) and/or the like. In some non-limiting embodiments, the potential (e.g., voltage (V)), current (e.g., amperes (A)), and/or power (e.g., watts (W)) of power source 102 may be selected (e.g., predetermined, preselected, dynamically selected, and/or the like) based on the power demands of the system (e.g., facility 160, DC bus 130, capacitive element array 140, and/or the like), based on availability (e.g., in the area of the system, of facility 160, and/or the like), and/or the like. For example, power source 102 may have a potential of 120 volts AC (VAC) (e.g., determined based on root mean squared (RMS) voltage and/or the like), 240 VAC, 480 VAC, 690 VAC, and/or the like.

Backup power source 104 may include any suitable power supply (e.g., separate from power source 102). For example, backup power source 104 may include a generator (e.g., diesel generator, gasoline generator, and/or the like). Additionally or alternatively, backup power source 104 may include a connection to a power grid (e.g., public power grid, municipal power grid, utility power grid, and/or the like, which may be separate from the power source 102), at least one battery, a windmill, a power plant (e.g., coal power plant, natural gas power plant, gasoline power plant, diesel power plant, nuclear power plant, any combination thereof, and/or the like), at least one solar panel (e.g., an array of solar panels), at least one thermoelectric device, any combination thereof, and/or the like. In some non-limiting embodiments, backup power source 104 may include an AC power supply. Additionally or alternatively, backup power source 104 may include a DC power supply. In some non-limiting embodiments, backup power source 104 may be connected (e.g., electrically connected, coupled, and/or the like) to input 120 (e.g., via transfer switch 122) and/or the like. In some non-limiting embodiments, the potential (e.g., voltage (V)), current (e.g., amperes (A)), and/or power (e.g., watts (W)) of backup power source 104 may be selected (e.g., predetermined, preselected, dynamically selected, and/or the like) based on the power demands of the system (e.g., facility 160, DC bus 130, capacitive element array 140, and/or the like), based on availability (e.g., in the area of the system, of facility 160, and/or the like), and/or the like. Additionally or alternatively, the potential, current, and/or power of backup power source 104 may be selected to match power source 102. For example, backup power source 104 may have a potential of 120 VAC, 240 VAC, 480 VAC, 690 VAC, and/or the like.

Controller 110 may include one or more devices capable of receiving information from, communicating information to, and/or controlling input 120, capacitive element array 140, discharge circuit 142, output 150, any combination thereof, and/or the like. In some non-limiting embodiments, controller 110 may be implemented in hardware, software, firmware, and/or any combination thereof. For example, controller 110 may include a computing device, such as a processor (e.g., a central processing unit (CPU), a graphics processing unit (GPU), an accelerated processing unit (APU), and/or the like), a microprocessor, a digital signal processor (DSP), a processing component (e.g., a field-programmable gate array (FPGA), an application-specific integrated circuit (ASIC), a programmable logic controller (PLC), and/or the like), a group of computing devices, other like devices, any combination thereof, and/or the like, which can be programmed to perform a function. In some non-limiting embodiments, controller 110 may include a cabinet including at least one processing component (e.g., PLC and/or the like), a human-machine interface (HMI), and/or the like. In some non-limiting embodiments, controller 110 may be in communication with a data storage device, which may be local or remote to controller 110. In some non-limiting embodiments, controller 110 may be capable of receiving information from, storing information in, communicating information to, and/or searching information stored in the data storage device.

Input 120 may include at least one electronic component, at least one circuit, any combination thereof, and/or the like. In some non-limiting embodiments, input 120 may be connected (e.g., electrically connected, coupled, and/or the like) to power source 102 and/or backup power source 104 (e.g., via transfer switch 122 and/or the like). Additionally or alternatively, input 120 may be connected (e.g., electrically connected, coupled, and/or the like) to DC bus 130. In some non-limiting embodiments, input 120 may be configured to receive power from the power supplies (e.g., power source 102 and/or backup power source 104 via transfer switch 122 and/or the like). Additionally or alternatively, input 120 may be configured to supply power to DC bus 130. In some non-limiting embodiments, input 120 may be configured to convert power. For example, if at least one of the power supplies (e.g., power source 102 and/or backup power source 104) is an AC power supply, input 120 may convert power from AC to DC. Additionally or alternatively, input 120 may be configured to convert power from a first potential (e.g., first voltage) to a second potential (e.g., second voltage). For example, the second potential (e.g., voltage) may be higher than the first potential (e.g., voltage). In some non-limiting embodiments, the second potential may be selected (e.g., predetermined, preselected, dynamically selected, and/or the like) based on the power demands of the system (e.g., facility 160, DC bus 130, capacitive element array 140, and/or the like) and/or the like. Additionally or alternatively, the second potential may be selected to meet and/or exceed a ratio based on the desired potential of DC bus 130 (e.g., the ratio of the potential of the DC bus 130 in volts DC (VDC) to the second potential in VAC may be less than or equal to 1.414 (e.g., the square root of 2), 1.3, 1.25, 1.231, 1.2, 1.15, 1.143, and/or the like). For example, the second potential may be 650 VAC, 700 VAC, 975 VAC, 1000 VAC, and/or the like. In some non-limiting embodiments, if at least one of the power supplies (e.g., power source 102 and/or backup power source 104) is an AC power supply, input 120 may include at least one transformer (e.g., a step-up transformer, a step-down transformer, an autotransformer, any combination thereof, and/or the like). Additionally or alternatively, input 120 may include at least one of a boost converter, a buck converter, a buck-boost converter, any combination thereof, and/or the like. In some non-limiting embodiments input 120 may include at least one of a filter (e.g., a radio frequency interference (RFI) filter and/or the like), a fuse, an inductor, any combination thereof, and/or the like.

In some non-limiting embodiments, input 120 may include transfer switch 122. For example, transfer switch 122 may be configured to switch between power source 102, backup power source 104, and/or the like. In some non-limiting embodiments, controller 110 may be configured to detect an interruption of power from one of the power sources (e.g., power source 102). Additionally or alternatively, controller 110 may be configured to control discharging of capacitive element array 140 (e.g., connected to DC bus 130) to continuously supply power from DC bus 130 to output 150 during the interruption. Additionally or alternatively, controller 110 may be configured to switch transfer switch 122 from first power source 102 to backup power source 104 (e.g., based on detecting the interruption in power source 102).

In some non-limiting embodiments, input 120 may include at least one switching element 124. For example, switching element 124 may include at least one rectifier (e.g., to convert AC power to DC power). For example, the at least on rectifier may include at least one silicon controlled rectifier (SCR), at least one insulated-gate bipolar transistor (IGBT) rectifier, any combination thereof, and/or the like. Additionally or alternatively, switching element 124 may include at least one switch (e.g., silicon controlled switch (SCS), a transistor switch, a metal-oxide-semiconductor field-effect transistor (MOSFET) switch, and IGBT switch, any combination thereof, and/or the like). In some non-limiting embodiments, controller 110 may control switching element 124 (e.g., directly, indirectly via a control board, any combination thereof, and/or the like), e.g., to control charging and/or discharging of capacitive element array 140 connected to the DC bus 130 (e.g., to supply power from DC bus 130 to output 150).

DC bus 130 may include any suitable high voltage bus. For example, DC bus 130 may include a busbar, a copper bar, a metallic bar, a conductive bar, a wide and/or thick conductor, any combination thereof, and/or the like. In some non-limiting embodiments, DC bus 130 may have relatively low resistance for DC power. Additionally or alternatively, DC bus 130 may be configured to operate in a range of voltages. For example, DC bus 130 may be configured to operate at voltages of 100-3,000 volts, over 480 volts, over 575 volts, over 650 volts, over 690 volts, over 700 volts, over 750 volts, any combination thereof, and/or the like. In some non-limiting embodiments, DC bus 130 may be connected (e.g., electrically connected, coupled, and/or the like) to input 120, capacitive element array 140, output 150, any combination thereof, and/or the like. In some non-limiting embodiments, the potential of DC bus 130 may be selected (e.g., predetermined, preselected, dynamically selected, and/or the like) based on the power demands of the system (e.g., facility 160, capacitive element array 140, output 150 (e.g., drive 152 thereof), and/or the like) and/or the like. Additionally or alternatively, the potential of DC bus 130 may be selected to meet and/or exceed a ratio based on the desired potential of output 150 (e.g., drive 152 thereof), e.g., the ratio of the potential of the DC bus 130 in VDC to the potential of output 150 (e.g., drive 152 thereof) in VAC may be less than or equal to 1.414 (e.g., the square root of 2), 1.3, 1.25, 1.231, 1.2, 1.15, 1.143, and/or the like). For example, the potential of DC bus 130 may be less than or equal to 800 VDC (e.g. a range of 790-800 VDC), less than or equal to 1200 VDC (e.g., a range of 1190-1200 VDC), and/or the like.

Capacitive element array 140 may include a plurality of capacitive elements (e.g., ultra-capacitors, supercapacitors, capacitors, any combination thereof, and/or the like). In some non-limiting embodiments, capacitive element array 140 may be connected (e.g., electrically connected, coupled, and/or the like) to DC bus 130 and/or like. In some non-limiting embodiments, capacitive element array 140 may include a number of capacitive elements (e.g., ultra-capacitors) selected based on the energy needs (e.g., power demands and/or the like) of the system. Additionally or alternatively, capacitive elements (e.g., ultra-capacitors) of capacitive element array 140 (e.g., ultra-capacitor array) may be provided in modules (e.g., subsets) corresponding to a fixed unit of energy storage representing a maximum suggested energy storage amount of the capacitive elements (e.g., ultra-capacitors) in the module. In some non-limiting embodiments, at least some capacitive elements (e.g., ultra-capacitors) (and/or modules thereof) may be connected in series, e.g., such that the combined (e.g., summed and/or the like) voltage of the series-connected capacitive elements (e.g., ultra-capacitors) satisfies (e.g., equals, exceeds, and/or the like) the desired operating voltages of DC bus 130, output 150, and/or the like. Additionally or alternatively, at least some capacitive elements (e.g., ultra-capacitors) (and/or modules thereof) may be connected in parallel, e.g., such that the combined (e.g., summed and/or the like) current of the series-connected capacitive elements (e.g., ultra-capacitors) satisfies (e.g., equals, exceeds, and/or the like) the desired current of the system (e.g., output 150, facility 160, and/or the like). For example, capacitive element array 140 may include a plurality of modules, each module including a plurality of capacitive elements (e.g., ultra-capacitors) in series to combine to provide the desired operating voltage of DC bus 130 and/or output 150, and the modules may be connected in parallel with each other to provide the desired current of the system (e.g., output 150, facility 160, and/or the like). In some non-limiting embodiments, the capacitance (e.g., farads (F)) of capacitive element array 140 may be selected (e.g., predetermined, preselected, dynamically selected, and/or the like) based on the power demands of the system (e.g., facility 160, DC bus 130, output 150 (e.g., drive 152 thereof), and/or the like) and/or the like. Additionally or alternatively, the capacitance (e.g., farads (F)) of capacitive element array 140 may be selected to meet and/or exceed a ratio based on the desired potential, power, and/or the like of DC bus 130. For example, the capacitance of capacitive element array 140 may be 13.88 F, 30 F, 60 F, and/or the like. In some non-limiting embodiments, the capacitance of capacitive element array 140 may be selected to provide sufficient power to facility 160 for a selected period of time. For example, the capacitance of capacitive element array 140 may be selected to ensure that capacitive element array 140 can provide sufficient power for facility 160 to operate at peak power for at least one minute, at least two minutes, at least five minutes, and/or the like. For the purpose of illustration, backup power source 104 (e.g., a generator and/or the like) may take less than one minute (e.g., less than 30 seconds, 15-30 seconds, less than 15 seconds, less than 10 seconds, less than 5 seconds, 2-3 seconds, and/or the like) to turn on and/or begin delivering power, and/or backup power source 104 may programmed and/or configured to turn on after a selected period of time (e.g., 5 seconds, 15 seconds, 30 seconds, and/or the like) after power source 102 fails (e.g., based on knowing that power outages on average are 15-20 seconds in most areas). Additionally or alternatively, the capacitance of capacitive element array 140 may be selected to ensure that capacitive element array 140 can provide sufficient power for facility 160 to operate at peak power for at least the amount of time that backup power source 104 needs and/or is programmed/ configured to turn on. In some non-limiting embodiments, after backup power source 104 is turned on, input 120 (e.g., transfer switch 122) may be controlled (e.g., by controller 110 and/or the like) to switch power from capacitive element array 140 to backup power source 104 after a selected period of time (e.g., 5 seconds, 10 seconds, 25 seconds, 30 seconds, 1 minute, and/or the like, knowing that power outages on average are 15-20 seconds in most areas). Additionally or alternatively, input 120 (e.g., transfer switch 122) may be controlled (e.g., by controller 110 and/or the like) to continue using power from backup power source 104 until power source 102 is back online for a selected period of time (e.g., in case there are multiple outages in succession, power from backup power source 104 may be used until power source 102 is back online for at least 5 minutes, at least 10 minutes, and/or the like). In some non-limiting embodiments, after input 120 (e.g., transfer switch 122) is controlled (e.g., by controller 110 and/or the like) to switch to power from power source 102, backup power source (e.g., a generator) may be programmed or configured to stay on (e.g., idle and/or the like) for a selected period of time (e.g., at least 5 minutes, at least 10 minutes, and/or the like) after such switch (e.g., in case there are multiple outages in succession).

In some non-limiting embodiments, the charge level of capacitive element array 140 may be maintained within a range that is less than full capacity of capacitive element array 140 and greater than 0 V (e.g., 0 VDC). For example, the charge of capacitive element array 140 may be maintained (e.g., by controller 110 and/or the like) within a range of 640-780 V, 755-764 V, and/or the like. In some non-limiting embodiments, if the charge (e.g., voltage) of capacitive element array 140 drops below a threshold, an alert may be generated (e.g., by controller 110) and/or communicated (e.g., from controller 110 to a user device of a user). For example, the threshold may include the bottom of the aforementioned ranges, a selected threshold within such ranges, any combination thereof, and/or the like.

In some non-limiting embodiments, capacitive element array 140 may include discharge circuit 142. For example, discharge circuit 142 may be connected (e.g., electrically connected, coupled, and/or the like) to the capacitive element array 140 array and/or may be configured to discharge energy from the capacitive element array 140 (e.g., when powering down capacitive element array 140, for safety when a cabinet containing capacitive element array 140 is opened, when a failure is detected in the system, and/or the like). In some non-limiting embodiments, discharge circuit 142 may include a resistor bank, e.g., configured to convert electrical energy into heat, light, any combination thereof, and/or the like. Additionally or alternatively, discharge circuit 142 may be configured to completely discharge capacitive element array 140 in a predetermined (e.g., selected and/or the like) period of time (e.g., less than 15 minutes, less than 10 minutes, and/or the like). In some non-limiting embodiments, discharge circuit 142 may be triggered by any powering down event, e.g., a detected error in output 150 (e.g., drive 152 thereof), a detected tampering and/or security event, manually powering down, opening a cabinet containing capacitive element array 140, and/or the like. In some non-limiting embodiments, capacitive elements (e.g., ultra-capacitors) of capacitive element array 140 may be shielded from being touched (e.g., at the terminals of each capacitive element (e.g., ultra-capacitor), at the terminals of capacitive element array 140, at the terminals of DC bus 130, and/or the like).

Output 150 may include at least one electronic component, at least one circuit, any combination thereof, and/or the like. In some non-limiting embodiments, output 150 may be connected (e.g., electrically connected, coupled, and/or the like) to DC bus 130. Additionally or alternatively, output 150 may be connected (e.g., electrically connected, coupled, and/or the like) to facility 160. In some non-limiting embodiments, output 150 may be configured to receive power, e.g., from DC bus 130. Additionally or alternatively, output 150 may be configured to supply power to facility 160. In some non-limiting embodiments, output 150 may include an AC power supply (e.g., drive 152, such as a variable frequency drive and/or the like). Additionally or alternatively, output 150 (e.g., drive 152 thereof and/or the like) may be configured to convert power from DC to AC. In some non-limiting embodiments, the power outputted from output 150 may be in the same form as power source 102. Additionally or alternatively, the power outputted from output 150 may be in a form selected based on the energy needs (e.g., power demands and/or the like) of facility 160. Additionally or alternatively, the power outputted from output 150 may be in the same form as backup power source 104. For example, the power outputted from output 150 may have a potential of 120 VAC, 240 VAC, 480 VAC, 690 VAC, and/or the like.

In some non-limiting embodiments, output 150 may include drive 152. For example, drive 152 may include any suitable drive, e.g., variable frequency drive and/or the like. Additionally or alternatively, drive 152 may be configured to convert power from DC to AC.

In some non-limiting embodiments, output 150 may include filter/output transformer 154. For example, filter/output transformer 154 may include a filter configured to filter power outputted from drive 152 based on the form of power desired (e.g., selected and/or the like) for facility 160. Additionally or alternatively, filter/output transformer 154 may include an output transformer (e.g., a step-up transformer, a step-down transformer, an autotransformer, any combination thereof, and/or the like). For example, the output transformer may be configured to filter the output (e.g., supplied power) from drive 152. Additionally or alternatively, the output transformer may allow for a neutral connection to prevent the output (e.g., supplied power from drive 152) from floating. In some non-limiting embodiments, the output transformer may set a voltage of output 150. For example, the output transformer may convert (e.g., step up, step down, and/or the like) the voltage of power outputted from drive 152 to a suitable voltage for facility 160. For the purpose of illustration, if drive 152 outputs power having a voltage that is less than desired for facility 160 (e.g., to allow a greater swing in voltage (e.g., difference in maximum stored potential/voltage to minimum stored potential/voltage) of DC bus 130 and/or capacitive element array 140), the output transformer may convert (e.g., step up) the voltage of the power supplied by drive 152 to a desired voltage for supplying (e.g., outputting) from output 150 to facility 160. In some non-limiting embodiments, the output transformer may establish a neutral between phases of power output from drive 152 (e.g., when power outputted from drive 152 has multiple (e.g., three) phases).

Facility 160 may include any facility using electrical power. For example, facility 160 may include at least one of a place, a building, an amenity, a piece of equipment, and/or the like. Additionally or alternatively, facility 160 may include at least one item that was built, installed, established, and/or the like to serve a particular purpose. In some non-limiting embodiments, facility 160 may be connected (e.g., electrically connected, coupled, and/or the like) to output 150. In some non-limiting embodiments, facility 160 may include a facility in which it is desirable (e.g., required, preferable, critical for safety, and/or the like) to have uninterrupted (e.g., constant, constantly available, and/or the like) power. In some non-limiting embodiments, facility 160 may include a medical facility (e.g., a hospital and/or the like), e.g., where an interruption in power could cause harm to a person (e.g., patient, medical staff member, and/or the like). In some non-limiting embodiments, facility 160 may include a manufacturing facility (e.g., a factory and/or the like), e.g., where an interruption in power could cause harm to a person (e.g., an operator of heavy machinery, a worker on the factory floor, and/or the like), equipment (e.g., assembly line equipment, heavy industrial equipment, and/or the like), any combination thereof, and/or the like. In some non-limiting embodiments, facility 160 may include a public venue (e.g., office building, casino, event venue, and/or the like).

The number and arrangement of components, devices, and/or systems shown in FIGS. 1A-1B are provided as an example. There may be additional components, devices, and/or systems; fewer components, devices, and/or systems; different components, devices, and/or systems; and/or differently arranged components, devices, and/or systems than those shown in FIGS. 1A-1B. Furthermore, two or more components, devices, and/or systems shown in FIGS. 1A-1B may be implemented within a single component, device, and/or system, or a single component, device, and/or system shown in FIGS. 1A-1B may be implemented as multiple, distributed components, devices, and/or systems. Additionally or alternatively, a set of components (e.g., one or more components), a set of devices (e.g., one or more devices), and/or a set of systems (e.g., one or more systems) of environment 100 may perform one or more functions described as being performed by another set of components, another set of devices, and/or another set of systems of environment 100.

Figure 2:
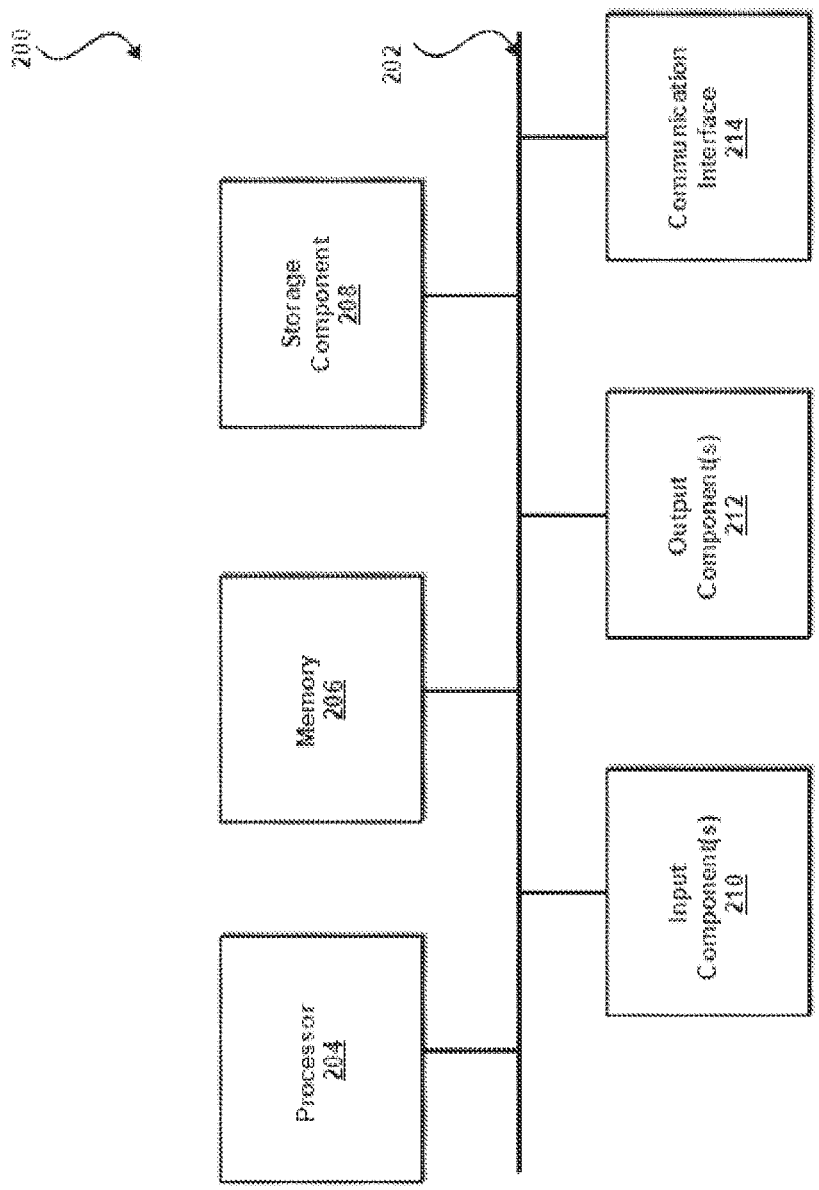
FIG. 2 is a diagram of a non-limiting embodiment of components of one or more devices of FIGS. 1A-1B.

Referring now to FIG. 2, FIG. 2 is a diagram of example components of a device 200. Device 200 may correspond to one or more devices of controller 110. In some non-limiting embodiments, controller 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), a programmable logic controller (PLC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a voltmeter, an ammeter, a multimeter, an electric meter, a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
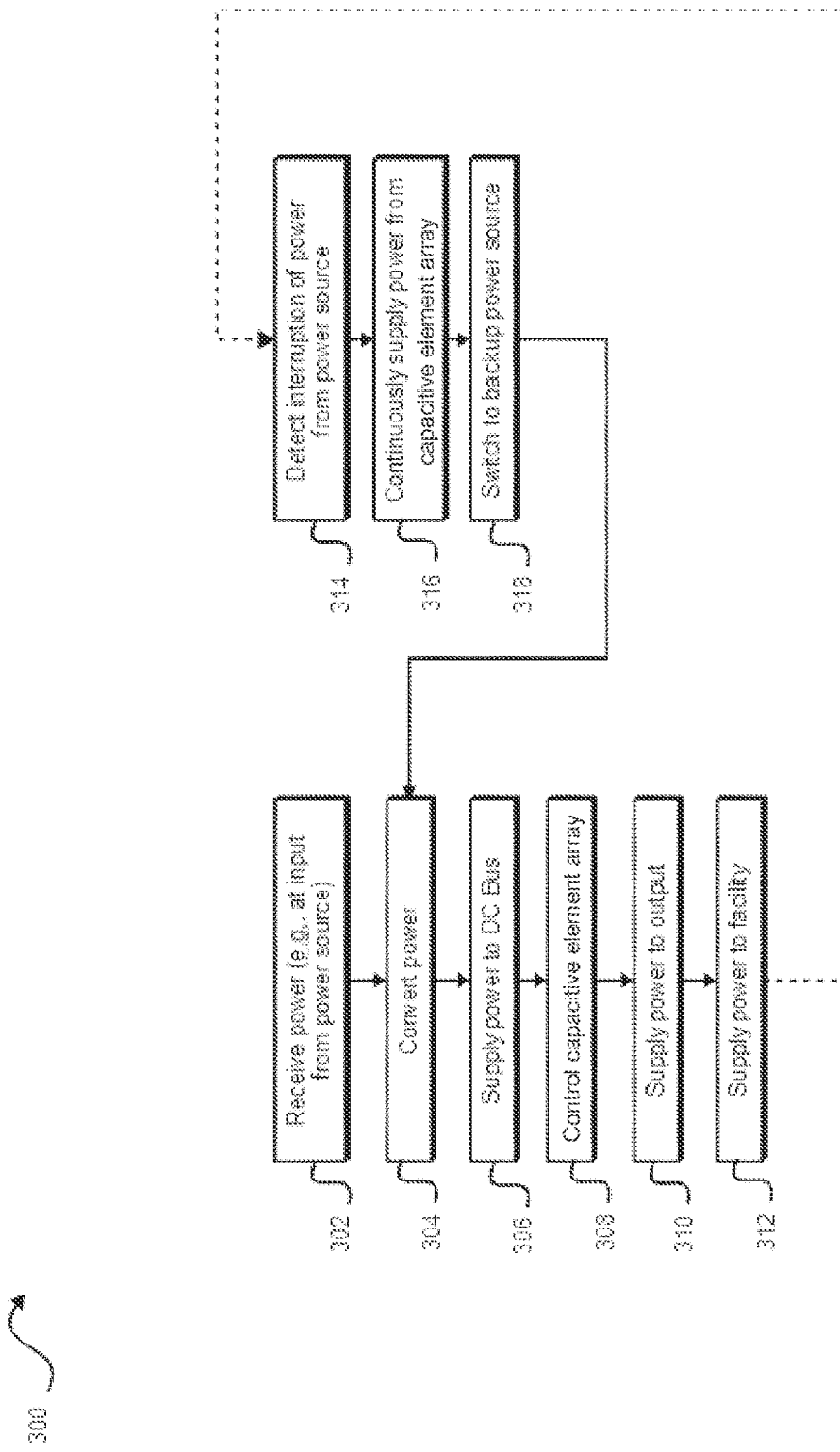
FIG. 3 is a flowchart of a non-limiting embodiment of a process for uninterrupted power using an array of capacitive elements (e.g., ultra-capacitors) according to the principles of the presently disclosed subject matter.

Referring now to FIG. 3, FIG. 3 is a flowchart of a non-limiting embodiment of a process 300 for uninterrupted power, e.g., using an array of capacitive elements (e.g., ultra-capacitors). In some non-limiting embodiments, one or more of the steps of process 300 may be performed (e.g., completely, partially, and/or the like) by controller 110 (e.g., one or more devices of controller 110). In some non-limiting embodiments, one or more of the steps of process 300 may be performed (e.g., completely, partially, and/or the like) by another component, another device, another system, another group of components, another group of devices, and/or another group of systems, separate from or including controller 110, such as power source 102, backup power source 104, input 120, DC bus 130, capacitive element array 140, output 150, facility 160, and/or the like.

As shown in FIG. 3, at step 302, process 300 may include receiving power, as described herein. For example, input 120 may receive power from (first) power source 102. Additionally or alternatively, power source 102 may supply power to input 120.

As shown in FIG. 3, at step 304, process 300 may include converting power, as described herein. For example, if (first) power source 102 includes an AC power source, input 120 may convert power from AC to DC. Additionally or alternatively, input 120 may convert power from a first voltage to a second voltage. For example, the second voltage may be higher than the first voltage. In some non-limiting embodiments, input 120 may filter power using at least one filter (e.g., an RFI filter and/or the like).

As shown in FIG. 3, at step 306, process 300 may include supplying power to a DC bus, as described herein. For example, input 120 may provide power to DC bus 130.

As shown in FIG. 3, at step 308, process 300 may include controlling an array of capacitive elements (e.g., ultra-capacitors), as described herein. For example, controller 110 may control charging and/or discharging of capacitive element array 140 (which may be connected to the DC bus 130). In some non-limiting embodiments, controller 110 may control charging and/or discharging of capacitive element array 140 by controlling input 120 (e.g., switching element 124 thereof). In some non-limiting embodiments, controller 110 may control charging and/or discharging of capacitive element array 140 based on potential (e.g., voltage) at one or more of input 120, DC bus 130, and/or the like. For example, controller 110 may control charging and/or discharging of capacitive element array 140 to maintain the voltage of DC bus within a selected (e.g., predetermined, dynamically selected, and/or the like) range. For example, the range of voltage may be above a first threshold and below a second threshold, and the second threshold (e.g., upper threshold) may be greater than the first threshold (e.g., lower threshold). Additionally or alternatively, controller 110 may control charging and/or discharging of capacitive element array 140 to maintain the charge stored in capacitive element array 140 within a selected (e.g., predetermined, dynamically selected, and/or the like) range. For example, the range of stored charge may be based on a selected proportion (e.g., percentage and/or the like) and/or the like of the maximum capacity (e.g., farad rating and/or the like) of charge storable by capacitive element array 140, e.g., greater than 40%, 45%, 50%, 55%, 60%, 65%, 70%, 75%, and/or the like of the maximum capacity (e.g., stop charging once capacitive element array 140 reaches 100% capacity and allow capacitive element array 140 to discharge until the amount of charge drops below the selected proportion of capacity, then begin charging again). In some non-limiting embodiments, the first (e.g., lower) threshold may be 790 VDC and/or the second (e.g., upper) threshold may be 800 VDC. In some non-limiting embodiments, the first (e.g., lower) threshold may be 1190 VDC and/or the second (e.g., upper) threshold may be 1200 VDC.

As shown in FIG. 3, at step 310, process 300 may include supplying power to an output, as described herein. For example, DC bus 130 may be connected to output 150 and/or may supply power to output 150. In some non-limiting embodiments, controller 110 may control charging and/or discharging of capacitive element array 140 connected (which may be connected to DC bus 130) to supply power from DC bus 130 to output 150.

As shown in FIG. 3, at step 312, process 300 may include supplying power to at least one facility, as described herein. For example, output 150 may supply power to facility 160. In some non-limiting embodiments, output 150 (e.g., an AC power supply thereof, such as drive 152 and/or the like) may be configured to convert power from DC to AC. Additionally or alternatively, output 150 (e.g., an AC power supply thereof, such as drive 152 and/or the like) may supply power to facility 160. In some non-limiting embodiments, output 150 may filter power using at least one filter (e.g., filter/output transformer 154 and/or the like), as described herein.

As shown in FIG. 3, at step 314, process 300 may include detecting an interruption of power from at least one power source, as described herein. For example, controller 110 may detect (e.g., directly, indirectly via transfer switch 122 and/or input 120, any combination thereof, and/or the like) an interruption of power from (first) power source 102.

As shown in FIG. 3, at step 316, process 300 may include continuously supplying power from an array of capacitive elements (e.g., ultra-capacitors), as described herein. For example, controller 110 may control the discharging of capacitive element array 140 (which may be connected to DC bus 130) to continuously supply power from DC bus 130 to output 150 during the interruption.

As shown in FIG. 3, at step 318, process 300 may include switching to a backup power source, as described herein. For example, transfer switch 122 may switch from (first) power source 102 to (second) backup power source 104. In some non-limiting embodiments, controller 110 may control transfer switch 122 to switch from (first) power source 102 to (second) backup power source 104.

As shown in FIG. 3, returning to step 304, process 300 may include converting power, as described herein. For example, if (second) backup power source 104 includes an AC power source, input 120 may convert power from AC to DC. Additionally or alternatively, input 120 may convert power from a first voltage to a second voltage. For example, the second voltage may be higher than the first voltage. In some non-limiting embodiments, input 120 may filter power using at least one filter (e.g., an RFI filter and/or the like).

As shown in FIG. 3, returning to step 306, process 300 may include supplying power to a DC bus, as described herein. For example, input 120 may provide power (e.g., from backup power source 104) to DC bus 130.

As shown in FIG. 3, returning to step 308, process 300 may include controlling an array of capacitive elements (e.g., ultra-capacitors), as described herein. For example, controller 110 may control charging and/or discharging of capacitive element array 140 (which may be connected to the DC bus 130). In some non-limiting embodiments, controller 110 may control charging and/or discharging of capacitive element array 140 by controlling input 120 (e.g., switching element 124 thereof). In some non-limiting embodiments, controller 110 may control charging and/or discharging of capacitive element array 140 based on potential (e.g., voltage) at one or more of input 120, DC bus 130, and/or the like; based on charge stored in capacitive element array 140; any combination thereof; and/or the like, as described herein.

As shown in FIG. 3, returning to step 310, process 300 may include supplying power to an output, as described herein. For example, DC bus 130 may be connected to output 150 and/or may supply power to output 150. In some non-limiting embodiments, controller 110 may control charging and/or discharging of capacitive element array 140 connected (which may be connected to DC bus 130) to supply power from DC bus 130 to output 150.

As shown in FIG. 3, returning to step 312, process 300 may include supplying power to at least one facility, as described herein. For example, output 150 may supply power to facility 160. In some non-limiting embodiments, output 150 (e.g., an AC power supply thereof, such as drive 152 and/or the like) may be configured to convert power from DC to AC. Additionally or alternatively, output 150 (e.g., an AC power supply thereof, such as drive 152 and/or the like) may supply power to facility 160. In some non-limiting embodiments, output 150 may filter power using at least one filter (e.g., filter/output transformer 154 and/or the like), as described herein.

Figure 4:
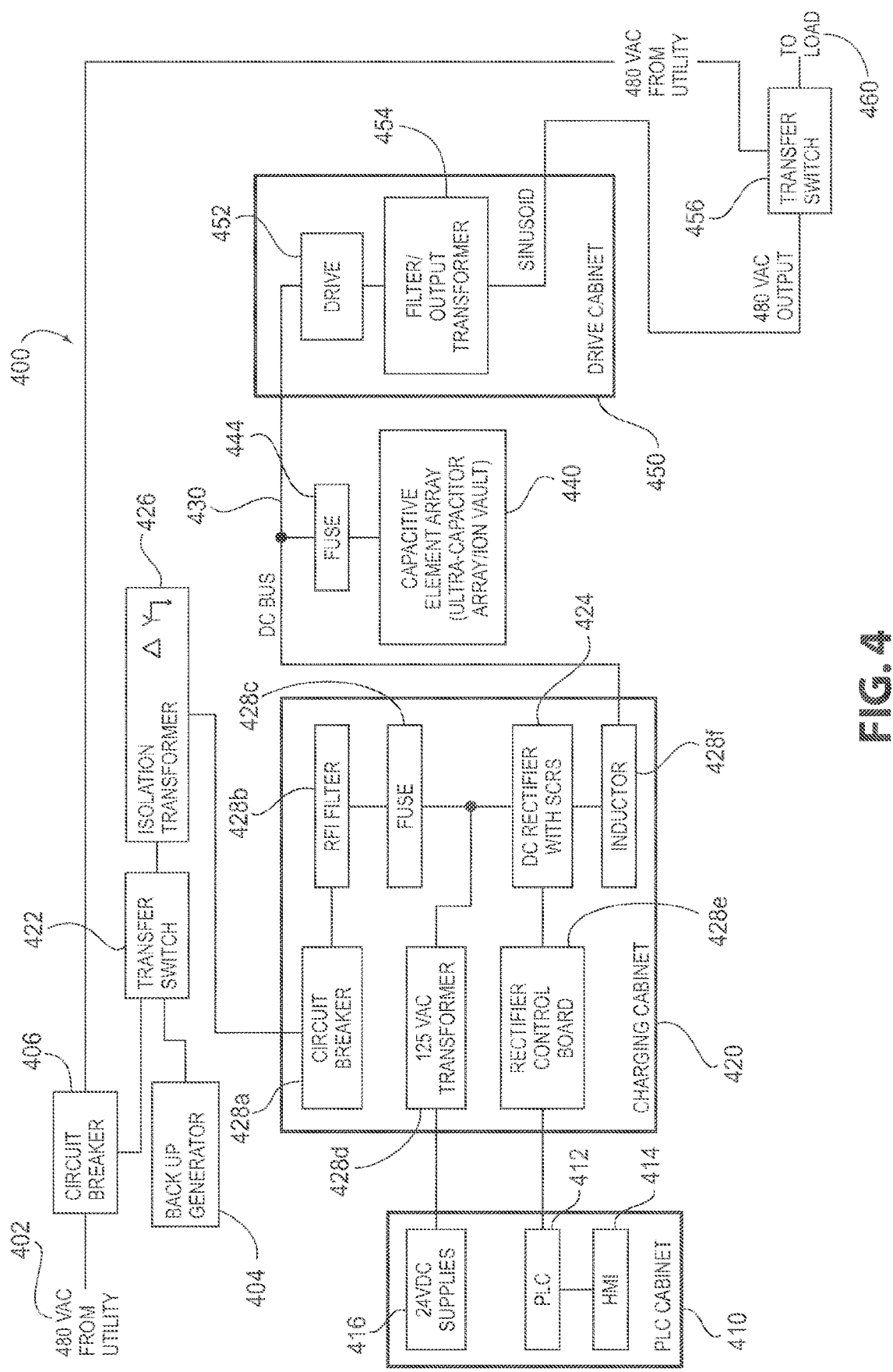
FIG. 4 is a diagram of a non-limiting embodiment of an implementation of a non-limiting embodiment of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include primary power source 402, backup power source 404, circuit breaker 406, transfer switch 422, transformer 426, PLC cabinet 410, charging cabinet 420, DC bus 430, capacitive element array 440, fuse 444, drive cabinet 450, transfer switch 456, load 460, and/or the like. In some non-limiting embodiments, primary power source 402 may be the same as or similar to power source 102. In some non-limiting embodiments, backup power source 404 may be the same as or similar to backup power source 104. In some non-limiting embodiments, transfer switch 422 may be the same as or similar to transfer switch 122. In some non-limiting embodiments, transformer 426 may be the same as, similar to, and/or part of input 120. In some non-limiting embodiments, PLC cabinet 410 may be the same as or similar to controller 110. In some non-limiting embodiments, charging cabinet 420 may be the same as or similar to input 120. In some non-limiting embodiments, DC bus 430 may be the same as or similar to DC bus 130. In some non-limiting embodiments, capacitive element array 440 may be the same as or similar to capacitive element array 140. In some non-limiting embodiments, drive cabinet 450 may be the same as or similar to output 150. In some non-limiting embodiments, load 460 may be the same as or similar to facility 160.

In some non-limiting embodiments, primary power source 402 may include a connection to a power grid (e.g., public power grid, municipal power grid, utility power grid, and/or the like), as described herein. For example, primary power source 402 may supply power in the form of 480 VAC, 690 VAC, and/or the like.

In some non-limiting embodiments, circuit breaker 406 may prevent damage to the system (e.g., transfer switch 422, isolation transformer 426, charging cabinet 420, capacitive element array 440, drive cabinet 450, PLC cabinet 410, load 460, and/or the like) from surges in power (e.g., from primary power source 402).

In some non-limiting embodiments, backup power source 404 may include a generator (e.g., diesel generator, gasoline generator, and/or the like), as described herein. For example, backup power source 404 may supply power in the form of 480 VAC, 690 VAC, and/or the like.

In some non-limiting embodiments, transformer 426 may include an isolation transformer. Additionally or alternatively, transformer 426 (e.g., the isolation transformer) may be a step-up transformer. For example, transformer 426 may convert power from 480 VAC to 650 VAC, 700 VAC, and/or the like, as described herein. Additionally or alternatively, transformer 426 may convert power from 690 VAC to 975 VAC, 1000 VAC, and/or the like, as described herein.

In some non-limiting embodiments, charging cabinet 420 may include circuit breaker 428a, RFI filter 428b, fuse 428c, and/or the like. For example, such component (e.g., RFI filter 428b and/or the like) may condition power received via transfer switch 422 and/or transformer 426 from the power source(s) (e.g., primary power source 402, backup power source 404, and/or the like). Additionally or alternatively, such components (e.g., circuit breaker 428a, fuse 428c, and/or the like) may prevent damage to charging cabinet 420 from surges in power (e.g., from the power source(s)).

In some non-limiting embodiments, charging cabinet 420 may include step-down transformer 428d. For example, step-down transformer 428d may convert power to a suitable voltage to be used by at least one power supply 416 of PLC cabinet 410. In some non-limiting embodiments, step-down transformer 428d may convert power from 575 VAC to 125 VAC. Additionally or alternatively, PLC cabinet 410 (e.g., power supply 416 thereof) may convert power from AC to DC. For example, PLC cabinet 410 (e.g., power supply 416 thereof) may convert power from step-down transformer 428d from 125 VAC to 24 VDC.

In some non-limiting embodiments, PLC cabinet 410 may include at least one human-machine interface (HMI) 414. For example, HMI 414 may include at least one input component, at least one output component, any combination thereof, and/or the like, as described herein.

In some non-limiting embodiments, PLC cabinet 410 may include at least one PLC 412. For example, PLC(s) 412 may include one or more devices (e.g., PLCs and/or the like) capable of receiving information from, communicating information to, and/or controlling charging cabinet 420 (e.g., rectifier control board 428e, DC rectifier 424, and/or the like thereof), transfer switch 422, capacitive element array 440, drive cabinet 450 (e.g., drive 452 thereof), backup power source 404, HMI 414, any combination thereof, and/or the like, as described herein.

In some non-limiting embodiments, charging cabinet 420 may include rectifier control board 428e. For example, rectifier control board 428e may include one or more devices capable of receiving information from, communicating information to, and/or being controlled by PLC 412. Additionally or alternatively, rectifier control board 428e may include one or more devices capable of receiving information from, communicating information to, and/or controlling DC rectifier 424. In some non-limiting embodiments, DC rectifier 424 may be the same as or similar to switching element 124. In some non-limiting embodiments, PLC 412 may control rectifier control board 428e, which may control DC rectifier 424 to thereby control charging and/or discharging of capacitive element array 440 connected to DC bus 430, as described herein. In some non-limiting embodiments, DC rectifier 424 may include at least one silicon controlled rectifier (SCR). Additionally or alternatively, DC rectifier 424 may include at least one IGBT rectifier.

In some non-limiting embodiments, charging cabinet 420 may include inductor 428f. For example, inductor 428f may condition power from DC rectifier 424. In some non-limiting embodiments, inductor 428f may ensure a relatively stable (e.g., constant and/or the like) DC current is supplied to DC bus 430 while DC rectifier 424 switches on and off.

In some non-limiting embodiments, fuse 444 may prevent damage to capacitive element array 440 from surges in power (e.g., from primary power source 402, backup power source 404, charging cabinet 420, and/or the like). Additionally or alternatively, fuse 444 may prevent may prevent damage to the rest of the system (e.g., charging cabinet 420, drive cabinet 450, PLC cabinet 410, load 460, and/or the like) from surges in power from capacitive element array 440.

In some non-limiting embodiments, PLC cabinet 410 (e.g., PLC 412 thereof) may control charging and/or discharging of capacitive element array 440 (e.g., via charging cabinet 420 (e.g., rectifier control board 428e and/or DC rectifier 424 thereof) connected to DC bus 430 and/or the like) to supply power from DC bus 430 to drive cabinet 450, as described herein. In some non-limiting embodiments, PLC cabinet 410 (e.g., PLC 412 thereof) may control charging and/or discharging of capacitive element array 440 to maintain the potential of DC Bus 430 and/or capacitive element array 440 in a range of 790-800 VDC, a range of 1190-1200 VDC, and/or the like, as described herein. In some non-limiting embodiments, PLC cabinet 410 (e.g., PLC 412 thereof) may detect an interruption of power from primary power source 402 and/or control discharging of capacitive element array 440 (e.g., via charging cabinet 420 (e.g., rectifier control board 428e and/or DC rectifier 424 thereof) connected to DC bus 430 and/or the like) to continuously supply power from DC bus 430 to the drive cabinet 450 during the interruption, as described herein. Additionally or alternatively, PLC cabinet 410 (e.g., PLC 412 thereof) may switch transfer switch 422 from primary power source 402 to backup power source 404, as described herein. In some non-limiting embodiments, capacitive element array 440 may have a potential of less than or equal to 800 V and a capacitance of 30 F or 60 F. In some non-limiting embodiments, capacitive element array 440 may have a potential of less than or equal to 1200 V and a capacitance of 13.88 F. In some non-limiting embodiments, capacitive element array 440 may have a potential of less than or equal to 1200 V and a capacitance of 30 F or 60 F.

In some non-limiting embodiments, drive cabinet 450 may include drive 452, as described herein. For example, drive 452 may include any suitable drive, e.g., variable frequency drive and/or the like. Additionally or alternatively, drive 452 may be configured to convert power from DC to AC.

In some non-limiting embodiments, drive cabinet 450 (e.g., drive 452 thereof and/or the like) may be configured to convert power from DC to AC. In some non-limiting embodiments, the power outputted from drive cabinet 450 may be in the same form as primary power source 402. Additionally or alternatively, the power outputted from drive cabinet 450 may be in a form selected based on the energy needs (e.g., power demands and/or the like) of load 460. Additionally or alternatively, the power outputted from drive cabinet 450 may be in the same form as backup power source 404.

In some non-limiting embodiments, drive cabinet 450 may include filter/output transformer 454. For example, filter/output transformer 454 may be configured to filter power outputted from drive 452 based on the form of power desired (e.g., selected and/or the like) for load 160. For example, filter/output transformer 454 may include a filter configured to filter power outputted from drive 452 based on the form of power desired (e.g., selected and/or the like) for load 460. Additionally or alternatively, filter/output transformer 454 may include an output transformer (e.g., a step-up transformer, a step-down transformer, an autotransformer, any combination thereof, and/or the like). For example, the output transformer may be configured to filter the output (e.g., supplied power) from drive 452. Additionally or alternatively, the output transformer may allow for a neutral connection to prevent the output (e.g., supplied power from drive 452) from floating. In some non-limiting embodiments, the output transformer may set a voltage of output 450. For example, the output transformer may convert (e.g., step up, step down, and/or the like) the voltage of power outputted from drive 452 to a suitable voltage for facility 160. For the purpose of illustration, if drive 452 outputs power having a voltage that is less than desired for load 460 (e.g., to allow a greater swing in voltage (e.g., difference in maximum stored potential/voltage to minimum stored potential/voltage) of DC bus 430 and/or capacitive element array 440), the output transformer may convert (e.g., step up) the voltage of the power supplied by drive 452 to a desired voltage for supplying (e.g., outputting) from drive cabinet 450 to load 460. In some non-limiting embodiments, the output transformer may establish a neutral between phases of power output from drive 452 (e.g., when power outputted from drive 152 has multiple (e.g., three) phases).

In some non-limiting embodiments, load 460 may include any facility using electrical power, as described herein.

Figure 5:
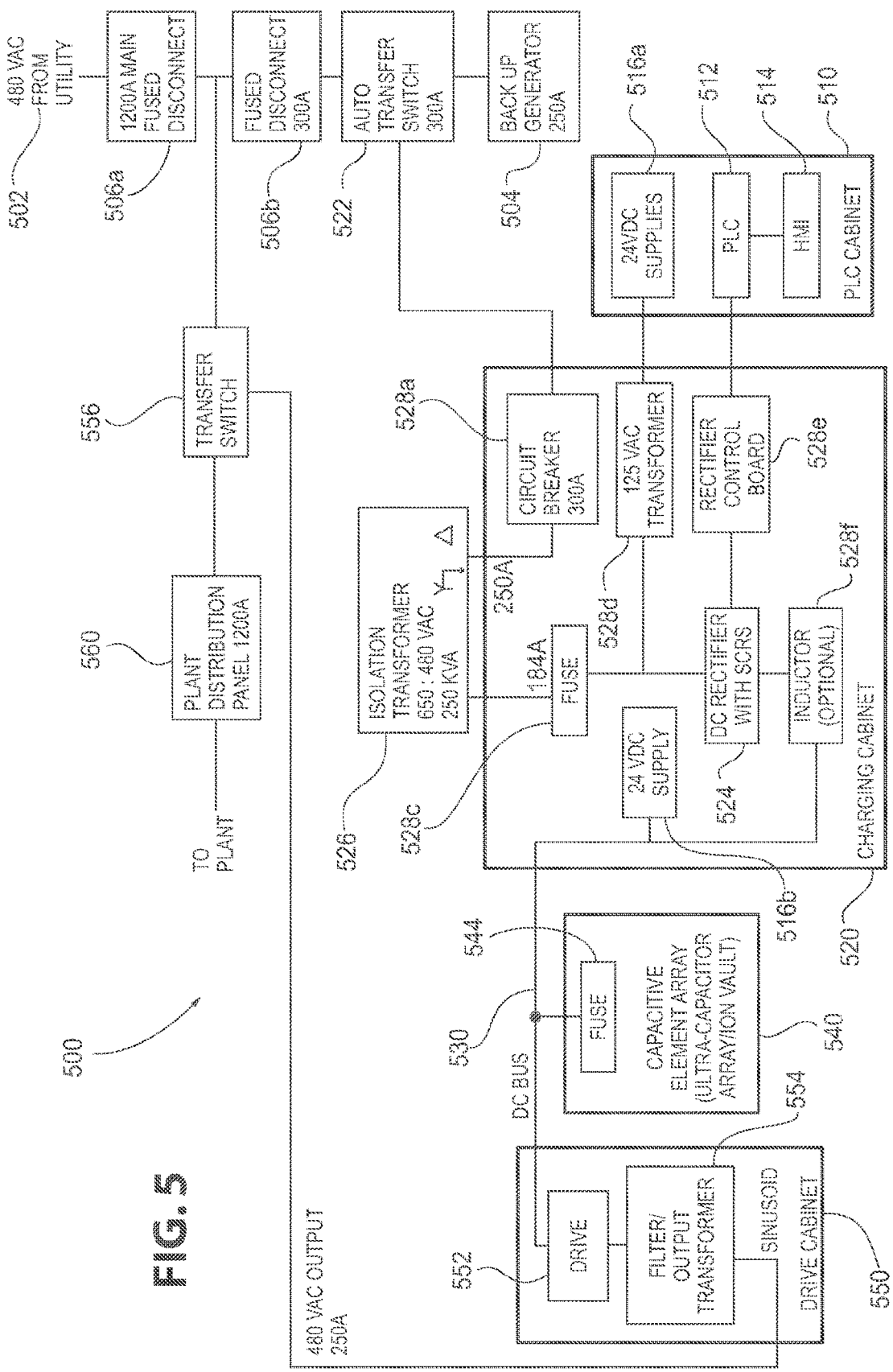
FIG. 5 is a diagram of a non-limiting embodiment of an implementation of a non-limiting embodiment of the process shown in FIG. 3 according to the principles of the presently disclosed subject matter.

Referring now to FIG. 5, FIG. 5 is a diagram of an exemplary implementation 500 of a non-limiting embodiment relating to process 300 shown in FIG. 3. As shown in FIG. 5, implementation 500 may include primary power source 502, backup power source 504, first fused disconnect 506a, second fused disconnect 506b, PLC cabinet 510, at least one PLC 512, HMI 514, power supply 516a, backup power supply 516b, charging cabinet 520, transfer switch 522, DC rectifier 524, isolation transformer 526, circuit breaker 528a, fuse 528c, step-down transformer 528d, rectifier control board 528e, inductor 528f, DC bus 530, capacitive element array 540, fuse 544, drive cabinet 550, drive 552, output filter/output transformer 554, transfer switch 556, plant distribution panel 560, and/or the like.

In some non-limiting embodiments, primary power source 502 may be the same as or similar to power source 102 and/or primary power source 402. In some non-limiting embodiments, backup power source 504 may be the same as or similar to backup power source 104 and/or backup power source 404. In some non-limiting embodiments, first fused disconnect 506a and/or second fused disconnect 506b may be the same as or similar to circuit breaker 406. Additionally or alternatively, each of first fused disconnect 506a and second fused disconnect 506b may include at least one fuse. In some non-limiting embodiments, PLC cabinet 510 may be the same as or similar to controller 110 and/or PLC cabinet 410. In some non-limiting embodiments, PLC 512 may be the same as or similar to PLC 412. In some non-limiting embodiments, HMI 514 may be the same as or similar to HMI 412. In some non-limiting embodiments, power supply 516a and/or backup power supply 516b may be the same as or similar to power supply 416. In some non-limiting embodiments, charging cabinet 520 may be the same as or similar to input 120 and/or charging cabinet 420. In some non-limiting embodiments, transfer switch 522 may be the same as or similar to transfer switch 122 and/or transfer switch 422. In some non-limiting embodiments, DC rectifier 524 may be the same as or similar to switching element 124 and/or DC rectifier 424. In some non-limiting embodiments, isolation transformer 526 may be the same as, similar to, and/or part of input 120 and/or transformer 426. In some non-limiting embodiments, circuit breaker 528a may be the same as or similar to circuit breaker 428a. In some non-limiting embodiments, fuse 528c may be the same as or similar to fuse 428c. In some non-limiting embodiments, step-down transformer 528d may be the same as or similar to step-down transformer 428d. In some non-limiting embodiments, rectifier control board 528e may be the same as or similar to rectifier control board 528e. In some non-limiting embodiments, inductor 528f may be the same as or similar to inductor 428f. In some non-limiting embodiments, DC bus 530 may be the same as or similar to DC bus 130 and/or DC bus 430. In some non-limiting embodiments, capacitive element array 540 may be the same as or similar to capacitive element array 140 and/or capacitive element array 440. In some non-limiting embodiments, fuse 544 may be the same as or similar to fuse 444. In some non-limiting embodiments, drive cabinet 550 may be the same as or similar to output 150 and/or drive cabinet 450. In some non-limiting embodiments, drive 552 may be the same as or similar to drive 152 and/or drive 452. In some non-limiting embodiments, output filter/output transformer 554 may be the same as or similar to filter/output transformer 154 and/or filter/output transformer 454. In some non-limiting embodiments, transfer switch 556 may be the same as or similar to transfer switch 456. In some non-limiting embodiments, plant distribution panel 560 may be the same as, similar to, and/or part of facility 160 and/or load 460.

In some non-limiting embodiments, implementation 500 may not include an RFI filter (e.g., such as RFI filter 428b), e.g., in charging cabinet 520. For example, implementation 500 may be able to operate without such an RFI filter.

In some non-limiting embodiments, implementation 500 may include a filter (not pictured) between charging cabinet 520 and DC bus 530.

In some non-limiting embodiments, charging cabinet 520 may include a chopper circuit (e.g., as part of DC rectifier 524, in addition to DC rectifier 524, in lieu of DC rectifier 524, and/or the like). For example, such a chopper circuit may include at least one IGBT controlled (e.g., by rectifier control board 528e, PLC 512, and/or the like) to control (e.g., limit, maintain below and/or above at least one threshold, and/or the like) the current flowing to DC bus 530, capacitive element array 540, and/or a discharge resistor (e.g., discharge circuit 142, another resistor separate from discharge circuit 142, any combination thereof, and/or the like) connected to capacitive element array 540.

Figure 6:
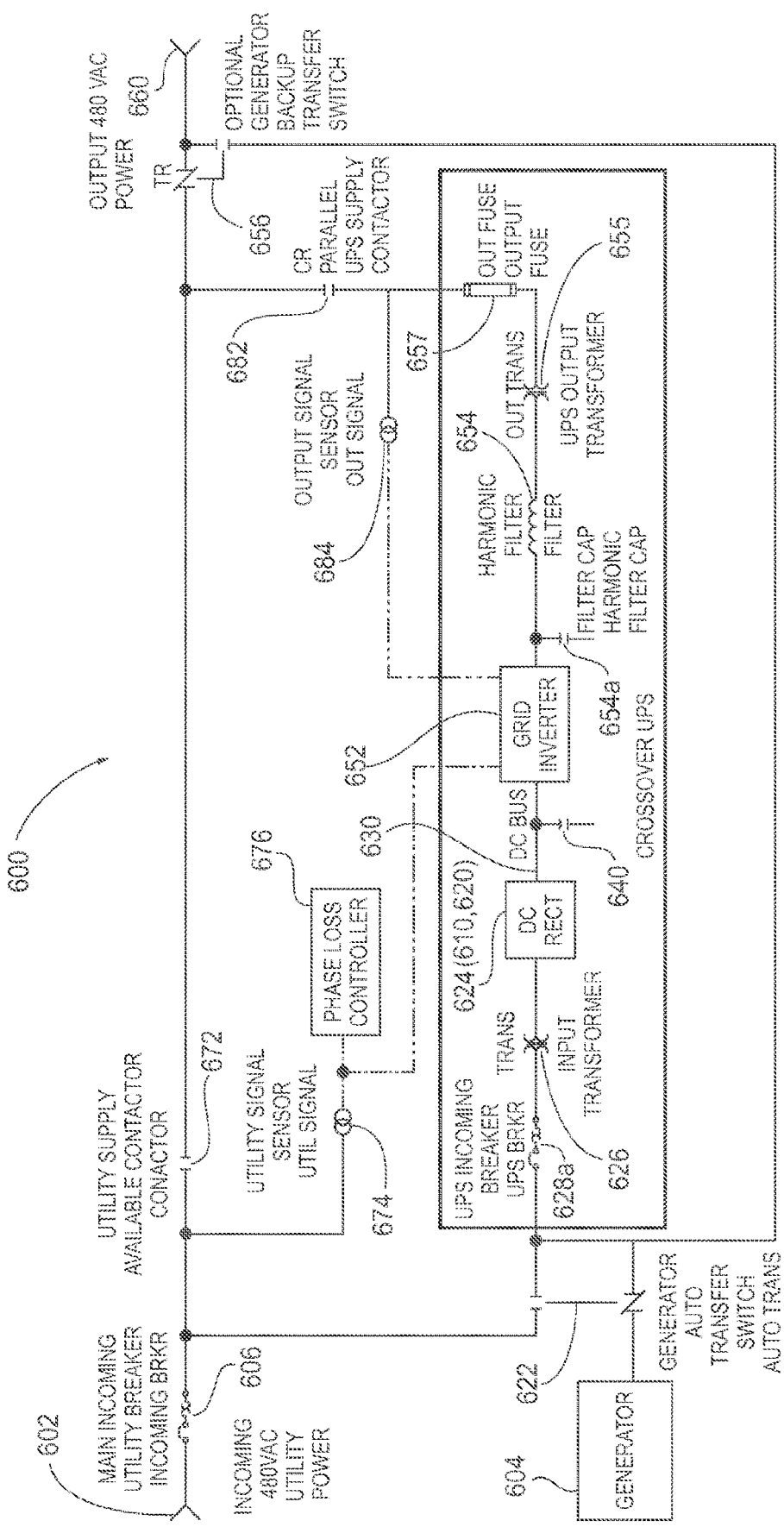
FIG. 6 is a diagram of a non-limiting embodiment of an implementation of a non-limiting embodiment of the process shown in FIG. 3 according to the principles of the presently disclosed subject matter.

Referring now to FIG. 6, FIG. 6 is a diagram of an exemplary implementation 600 of a non-limiting embodiment relating to process 300 shown in FIG. 3. As shown in FIG. 6, implementation 600 may include primary power source 602, backup power source 604, main circuit breaker 606, transfer switch 622, DC rectifier 624, input transformer 626, circuit breaker 628a, DC bus 630, capacitive element array 640, grid inverter 652, filter 654, filter capacitor 654a, output transformer 655, backup transfer switch 656, output fuse 657, facility connection 660, power source contactor 672, power source signal sensor 674, phase loss controller 676, output contactor 682, output signal sensor 684, and/or the like. In some non-limiting embodiments, DC rectifier 624 may include (e.g., have connected thereto and/or the like) PLC cabinet 610, charging cabinet 620, any combination thereof, and/or the like, as described herein.

In some non-limiting embodiments, primary power source 602 may be the same as or similar to power source 102, primary power source 402, and/or primary power source 502. In some non-limiting embodiments, backup power source 604 may be the same as or similar to backup power source 104, backup power source 404, and/or backup power source 504. In some non-limiting embodiments, main circuit breaker 606 may be the same as or similar to circuit breaker 406, first fused disconnect 506a, and/or second fused disconnect 506b. In some non-limiting embodiments, PLC cabinet 610 may be the same as or similar to controller 110, PLC cabinet 410, and/or PLC cabinet 510. In some non-limiting embodiments, charging cabinet 620 may be the same as or similar to input 120, charging cabinet 420, and/or charging cabinet 520. In some non-limiting embodiments, transfer switch 622 may be the same as or similar to transfer switch 122, switch 422, and/or transfer switch 522. In some non-limiting embodiments, DC rectifier 624 may be the same as or similar to switching element 124, DC rectifier 424, and/or DC rectifier 524. Additionally or alternatively, DC rectifier 624 may be the same as or similar to controller 110, PLC cabinet 410, PLC cabinet 510, input 120, charging cabinet 420, and/or charging cabinet 520. In some non-limiting embodiments, input transformer 626 may be the same as, similar to, and/or part of input 120, transformer 426, and/or isolation transformer 526. In some non-limiting embodiments, circuit breaker 628a may be the same as or similar to circuit breaker 428a and/or circuit breaker 528a. In some non-limiting embodiments, DC bus 630 may be the same as or similar to DC bus 130, DC bus 430, and/or DC bus 530. In some non-limiting embodiments, capacitive element array 640 may be the same as or similar to capacitive element array 140, capacitive element array 440, and/or capacitive element array 540. In some non-limiting embodiments, grid inverter 652 may be the same as or similar to drive 152, drive 452, and/or drive 552. In some non-limiting embodiments, filter 654 may be the same as or similar to filter/output transformer 154, filter/output transformer 454, and/or output filter/output transformer 554. In some non-limiting embodiments, output transformer 655 may be the same as or similar to filter/output transformer 154, filter/output transformer 454, and/or output filter/output transformer 554. In some non-limiting embodiments, backup transfer switch 656 may be the same as or similar to transfer switch 456 and/or transfer switch 556. In some non-limiting embodiments, facility connection 660 may be the same as, similar to, and/or part of facility 160, load 460, and/or plant distribution panel 560.

In some non-limiting embodiments, capacitive element array 640 may operate in parallel with primary power source 602 (e.g., a power grid and/or the like). Additionally or alternatively, operation in parallel may enable operation of capacitive element array 640 without interrupting the flow of power from primary power source 602 to facility connection 660.

In some non-limiting embodiments, operating capacitive element array 640 simultaneously with and in parallel with power from a primary power source 602 may enable operation of the facility (e.g., supply of power via facility connection 660) in at least five modes. For example, such modes may include facility connection 660 receiving power directly from primary power source 602, (e.g., without receiving power from capacitive element array 640, such as in the event that capacitive element array 640 fails, is taken offline for maintenance, and/or the like), facility connection 660 constantly receiving power from the power source in parallel with capacitive element array 640 (e.g., with grid inverter 652 synchronizing power from capacitive element array 640 with power from primary power source 602), facility connection 660 receiving power directly from capacitive element array 640 (e.g., without receiving power from primary power source 602, such as when primary power source 602 fails (e.g., a power outage, disconnecting the power for maintenance, and/or the like), facility connection 660 receiving power from capacitive element array 640 with backup power source 604 supplying power to simultaneously charge capacitive element array 640, facility connection 660 receiving power directly from backup power source 604 (e.g., without receiving power from capacitive element array 640, such as after backup power source 604 is fully started up and capable of supplying sufficient power to facility connection 660 without capacitive element array 640; after manually switching over to backup power source 604; after capacitive element array 640 fails, is taken offline for maintenance, and/or the like; and/or the like), and/or the like.

In some non-limiting embodiments, if power from primary power source 602 (e.g., a power grid and/or the like) is interrupted, capacitive element array 640 may supply power to facility connection 660 continuously (e.g., with no interruption to power delivered to facility connection 660) until backup power source 604 (e.g., a generator and/or the like) starts up (e.g., turns on and/or the like). For example, if power source signal sensor 674 and/or phase loss controller 676 detect that power from primary power source 602 is interrupted, power source contactor 672 may open (e.g., phase loss controller 676 may open power source contactor 672), and/or capacitive element array 640 may supply power to grid inverter 652, which may supply power to facility connection 660 (e.g., directly; indirectly via filter 654, output transformer 655, output fuse 657, output contactor 682, and/or backup transfer switch 656; and/or the like). Additionally or alternatively, backup power source 604 may turn on, and/or transfer switch 622 may switch the connection from primary power source 602 to backup power source 604. Additionally or alternatively, backup power source 604 may supply power to (e.g., charge, recharge, and/or the like) capacitive element array 640 (e.g., with no interruption to power delivered to facility connection 660).

In some non-limiting embodiments, after power from primary power source 602 is interrupted, if primary power source 602 comes back on (e.g., an outage of a power grid ends and/or the like), grid inverter 652 may synchronize power being supplied therefrom with power from primary power source 602 (e.g., three-phase AC power form a power grid, single-phase AC from a power grid, any combination thereof, and/or the like). For example, grid inverter 652 may receive (e.g., from power source signal sensor 674 and/or phase loss controller 676) at least one signal indicating that power is once again available from primary power source 602 (e.g., power source signal sensor 674 may detect power from primary power source 602, power source signal sensor 674 and/or phase loss controller 676 may communicate the signal(s) to grid inverter 652). Additionally or alternatively, once power being supplied by grid inverter 652 is synchronized with power from primary power source 602, power source contactor 672 may close (e.g., phase loss controller 676 may close power source contactor 672), and/or grid inverter 652 may remain in sync with primary power source 602 (e.g., based on at least one signal from output signal sensor 684). In some non-limiting embodiments, during the synchronization, grid inverter 652 may maintain the output therefrom (e.g., continue supplying power therefrom based on power being supplied by capacitive element array 640). For example, grid inverter 652 may maintain such output utilizing an internal control loop and/or the like.

In some non-limiting embodiments, if capacitive element array 640 (and/or grid inverter 652) is offline, output contactor 682 may open (e.g., based on a signal from capacitive element array 640, grid inverter 652, output signal sensor 684, any combination thereof, and/or the like). For example, in such a situation, primary power source 602 and/or backup power source 604 may supply power to facility connection (e.g., directly; indirectly via main circuit breaker 606, power source contactor 672, and/or power source contactor 672; indirectly via transfer switch 622 and/or backup transfer switch 656; and/or the like). In some non-limiting embodiments, to get capacitive element array 640 (and/or grid inverter 652) back online, grid inverter 652 may synchronize with primary power source 602 and/or backup power source 604, as described herein. Additionally or alternatively, output contactor 682 may close. As such, capacitive element array 640 and primary power source 602 or backup power source 604 may be in parallel again.

In some non-limiting embodiments, grid inverter 652, filter 654, filter capacitor 654a, output transformer 655, and/or output fuse 657 may be contained in a drive cabinet (e.g., the same as or similar to output 150, drive cabinet 450, and/or drive cabinet 550), as described herein.

In some non-limiting embodiments, output transformer 655 may filter the output (e.g., supplied power) from grid inverter 652. Additionally or alternatively, output transformer 655 may allow for a neutral connection to prevent the output (e.g., supplied power from grid inverter 652) from floating.

In some non-limiting embodiments, filter capacitor 654a may include at least one capacitor. Additionally or alternatively, filter capacitor 654a may be connected to filter 654. In some non-limiting embodiments, filter 654 may include at least one harmonic filter. In some non-limiting embodiments, filter capacitor 654a and filter 654 may filter power outputted from grid inverter 652 based on the form of power desired (e.g., selected and/or the like) for facility connection 660.

In some non-limiting embodiments, grid inverter 652 may allow for bidirectional flow of power (e.g., bidirectional current and/or the like). For example, grid inverter 652 may include an active front end (AFE) drive, a bidirectional drive, and/or the like. For the purpose of illustration, the facility (e.g., connected via facility connection 660) may include at least one device that (for at least some time periods) has power that can be recaptured (e.g., excess energy, kinetic energy, gravitational potential energy, chemical potential energy, thermal energy, and/or the like), e.g., a mechanical device with kinetic energy, gravitational potential energy, and/or the like. For example, a pump may have an up stroke (e.g., during which energy from an electric motor is used to move a moving part such as a rod upwards) and a down stroke (e.g., during which gravity moves the moving part downwards), and during the down stroke, the moving part may cause the electric motor to rotate, which may produce power (e.g., current) that may be recaptured. For example, a moving vehicle may have time periods during which the vehicle accelerates and/or maintains speed (e.g., during which energy from an electric motor is used to propel the vehicle) and time periods during which the vehicle decelerates (e.g., during which power (e.g., current) may be produced in the electric motor, that may be recaptured). In some non-limiting embodiments, grid inverter 652 may allow for bidirectional flow such that the (excess, recapturable, and/or the like) power (e.g., current generated by the facility) that flows to grid inverter 652 via facility connection 660 (e.g., power the flows in the reverse direction) may be converted from AC power to DC power (e.g., by grid inverter 652), and the DC power may be supplied to DC bus 630. Additionally or alternatively, DC bus 630 may charge capacitive element array 640 (e.g., with the power supplied by grid inverter 652).

In some non-limiting embodiments, if the power from facility connection 660 (e.g., power flowing in the reverse direction) exceeds a threshold (e.g., if voltage of the power flowing in the reverse direction exceeds a selected voltage, a maximum voltage of the DC bus 630, and/or a maximum voltage of capacitive element array 640), the excessive power may be controlled by at least one of a chopper circuit, a discharge circuit (e.g., a contactor (e.g., discharge contactor) and at least one resistor (e.g., discharge resistor(s)), any combination thereof, and/or the like. For example, charging cabinet 620 may include a chopper circuit (e.g., as part of DC rectifier 624, in addition to DC rectifier 624, in lieu of DC rectifier 624, and/or the like), e.g., including at least one IGBT controlled to control the current flowing to DC bus 630 and/or capacitive element array 640, as described herein. Additionally or alternatively, charging cabinet 620, capacitive element array 640, and/or the like may include a discharge circuit, which may include a contactor (e.g., discharge contactor) and at least one resistor (e.g., discharge resistor(s)). In some non-limiting embodiments, if the power from facility connection 660 (e.g., power flowing in the reverse direction) has a voltage that exceeds a threshold (e.g., a selected voltage, a maximum voltage of the DC bus 630 and/or a maximum voltage of capacitive element array 640), the chopper circuit may reduce the voltage of such power. Additionally or alternatively, if the power from facility connection 660 (e.g., power flowing in the reverse direction) has a voltage that exceeds the threshold, a discharge contactor of the discharge circuit may close and/or at least a portion of the power (e.g., an excess portion and/or the like) may be consumed by at least one discharge resistor of the discharge circuit (e.g., voltage may drop across the discharge resistor(s)). In some non-limiting embodiments, the chopper circuit and the discharge circuit may be used simultaneously (e.g., may be redundant circuits for controlling excess power). For example, the chopper circuit may include IGBTs that are relatively fast and/or may initially be used to control the excess power (e.g., excess voltage of such power), and/or the discharge circuit may include a mechanical contactor that is relatively slow (e.g., compared to solid state devices such as the IGBTs) and/or may be used to control the excess power if the chopper circuit fails and/or cannot sufficiently reduce the voltage below the threshold.

In some non-limiting embodiments, at least one additional energy storage device (e.g., at least one battery and/or the like) may be included in addition to capacitive element array 640. For example, the additional energy storage device(s) (e.g., a plurality of batteries and/or the like) may be connected in parallel with capacitive element array 640. Additionally or alternatively, the additional energy storage device(s) may provide additional power after capacitive element array 640 partially discharges. For example, as the power supplied by capacitive element array 640 drops, the additional energy storage device(s) may begin providing power (e.g., simultaneously with capacitive element array 640 beginning to supply power, after the voltage of capacitive element array 640 drops below a selected threshold, and/or the like). In some non-limiting embodiments, such additional energy storage device(s) may provide power for a longer duration than capacitive element array 640 (e.g., if backup power source 604 take longer to start up than capacitive element array 640 is capable of supplying sufficient power). In some non-limiting embodiments, the additional energy storage device(s) (e.g., batteries and/or the like) may require longer time to recharge than capacitive element array 640.

In some non-limiting embodiments, at least one voltage converter (e.g., a DC-to-DC converter and/or the like) may be connected between capacitive element array 640 and grid inverter 652. For example, the voltage converter(s) may include at least one of a step-down (buck) converter, a step-up (boost) converter, a buck-boost converter, any combination thereof, and/or the like. In some non-limiting embodiments, the voltage converter(s) may be used to increase the voltage of power supplied by capacitive element array 640 to grid inverter 652 (e.g., while capacitive element array 640 is discharging), e.g., so that, if the voltage of capacitive element array 640 drops below a minimum input voltage of grid inverter 652, the voltage of the power supplied to grid inverter 652 may still exceed the minimum input voltage thereof. Additionally or alternatively, as the voltage converter(s) increase the voltage of the power supplied by capacitive element array 640, the current of the power supplied by capacitive element array 640 may be reduced. For example, power (P) may be equal to the product of current (I) and voltage (V) (e.g., P=IV), and the voltage converter increasing voltage (V) may result in a reduction of current (I), since power may remain the same.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A system, comprising:
   an input configured to receive power from a first power source;
   a direct current (DC) bus connected to the input and configured to receive power from the input;
   an array of ultra-capacitors connected to the DC bus;
   at least one discharge circuit connected to the array of ultra-capacitors, the discharge circuit configured to discharge energy from the array of ultra-capacitors when at least one of a container containing the array of ultra-capacitors is opened, a failure of the array of ultra-capacitors is detected, powering down the array of ultra-capacitors, or a failure is detected;
   an output connected to the DC bus, the output comprising an alternating current (AC) power supply configured to supply power to at least one facility, wherein the AC power supply of the output comprises at least one of a variable frequency drive or a bidirectional drive; and
   at least one controller configured to:
      control charging and discharging of the array of ultra-capacitors connected to the DC bus to supply power from the DC bus to the output;
      detect an interruption of power from the first power source;
      control discharging of the array of ultra-capacitors connected to the DC bus to continuously supply power from the DC bus to the output during the interruption; and switch a transfer switch from the first power source to a second power source, wherein the input is further configured to receive power from the second power source.

2. The system of claim 1, wherein the first power source comprises a power grid, the system further comprising:
a circuit breaker connected between the power grid and the input.

3. The system of claim 1, further comprising a converter configured to convert power from a first voltage to a second voltage, the second voltage higher than the first voltage.

4. The system of claim 1, wherein the input comprises at least one of a circuit breaker, a filter, a fuse, a transformer, a rectifier, an inductor, a control board, or any combination thereof.

5. The system of claim 1, further comprising at least one fuse connected between the DC bus and the array of ultra-capacitors.

6. The system of claim 1, wherein the output comprises at least one filter.

7. A method, comprising:
receiving power at an input from a first power source;
supplying power from the input to a direct current (DC) bus;
controlling charging and discharging of an array of ultra-capacitors connected to the DC bus to supply power from the DC bus to an output, wherein at least one discharge circuit is connected to the array of ultra-capacitors and configured to discharge energy from the array of ultra-capacitors when at least one of a container containing the array of ultra-capacitors is opened, a failure of the array of ultra-capacitors is detected, powering down the array of ultra-capacitors, or a failure is detected;
supplying power from an alternating current (AC) power supply of the output to at least one facility, wherein the AC power supply of the output comprises at least one of a variable frequency drive or a bidirectional drive;
detecting an interruption of power from the first power source;
controlling discharging of the array of ultra-capacitors connected to the DC bus to continuously supply power from the DC bus to the output during the interruption; and
switching a transfer switch from the first power source to a second power source.

8. The method of claim 7, wherein the first power source comprises an AC power source, further comprising:
converting, by the input, power from AC to DC.

9. The method of claim 7, further comprising:
converting, by the input, power from a first voltage to a second voltage, the second voltage higher than the first voltage.

10. The method of claim 7, further comprising at least one of:
filtering, by the input, power with at least one first filter;
filtering, by the output, power with at least one second filter; or
any combination thereof.

11. The method of claim 7, further comprising:
receiving power at the input from the second power source;
supplying power from the input to the DC bus; and
controlling charging and discharging of the array of ultra-capacitors connected to the DC bus to supply power from the DC bus to the output.

12. The method of claim 11, wherein the second power source comprises an AC power source, further comprising:
converting, by the input, power from AC to DC.

13. A computer program product comprising at least one non-transitory computer-readable medium including one or more instructions that, when executed by at least one processor, cause the at least one processor to:
control an input to receive power at the input from a first power source and supply power from the input to a direct current (DC) bus;
control charging and discharging of an array of ultra-capacitors connected to the DC bus to supply power from the DC bus to an output, wherein at least one discharge circuit is connected to the array of ultra-capacitors and configured to discharge energy from the array of ultra-capacitors when at least one of a container containing the array of ultra-capacitors is opened, a failure of the array of ultra-capacitors is detected, powering down the array of ultra-capacitors, or a failure is detected; and
control the output to supply power from an alternating current (AC) power supply of the output to at least one facility, wherein the AC power supply of the output comprises at least one of a variable frequency drive or a bidirectional drive;
detect an interruption of power from the first power source;
control discharging of the array of ultra-capacitors connected to the DC bus to continuously supply power from the DC bus to the output during the interruption; and
switch a transfer switch from the first power source to a second power source.

14. The computer program product of claim 13, wherein the instructions further cause the at least one processor to:
control the input to receive power from the second power source and supply power from the input to the DC bus; and
control charging and discharging of the array of ultra-capacitors connected to the DC bus to supply power from the DC bus to the output.

* * * * *